United States Patent
Regmi et al.

(10) Patent No.: US 10,831,470 B2
(45) Date of Patent: Nov. 10, 2020

(54) SIMULATING A TOPOLOGY OF NETWORK ELEMENTS

(71) Applicant: Arista Networks, Inc., Santa Clara, CA (US)

(72) Inventors: Sudip Regmi, Fremont, CA (US); Udayakumar Srinivasan, Fremont, CA (US); Kenneth James Duda, Menlo Park, CA (US); Anirban Sinha, Vancouver (CA)

(73) Assignee: Arista Networks, Inc., Santa Clara, CA (US)

( * ) Notice: Subject to any disclaimer, the term of this patent is extended or adjusted under 35 U.S.C. 154(b) by 525 days.

(21) Appl. No.: 15/626,031

(22) Filed: Jun. 16, 2017

(65) Prior Publication Data
US 2018/0248769 A1 Aug. 30, 2018

Related U.S. Application Data

(60) Provisional application No. 62/465,121, filed on Feb. 28, 2017.

(51) Int. Cl.
*G06F 8/656* (2018.01)
*H04L 29/08* (2006.01)
(Continued)

(52) U.S. Cl.
CPC ............... *G06F 8/656* (2018.02); *G06F 8/61* (2013.01); *G06F 8/65* (2013.01); *G06F 9/4411* (2013.01);
(Continued)

(58) Field of Classification Search
CPC ..... H04L 41/145; H04L 43/50; H04L 41/082; H04L 41/20; H04L 67/34; H04L 67/20;
(Continued)

(56) References Cited

U.S. PATENT DOCUMENTS 6,601,227 B1 7/2003 Trimberger
6,633,878 B1 10/2003 Underwood
(Continued)

FOREIGN PATENT DOCUMENTS

WO 2016033785 A1 3/2016

OTHER PUBLICATIONS

Bardgett et al. "nSwitching: Virtual Machine Aware Relay Hardware Switching to improve intra-NIC Virtual Machine Traffic". IEEE ICC 2012—Next-Generation Networking Symposium. p. 2700-2705.*

(Continued)

*Primary Examiner* — Eunhee Kim
(74) *Attorney, Agent, or Firm* — Fountainhead Law Group PC

(57) ABSTRACT

A method and apparatus of a device that simulates a plurality of network elements is described. In an exemplary embodiment, the device receives network topology information for the plurality of simulated network elements. The device further instantiates a container for each of the plurality of simulated network elements. The device additionally configures a set of processes for each of the plurality of containers, where each of the set of processes simulates at least one of the plurality of simulated network elements. The plurality of set of processes further implements a network topology represented by the network topology information. The device performs a test of the network topology and saves the results of the test.

22 Claims, 17 Drawing Sheets

(51) Int. Cl.

| | | |
|---|---|---|
| *H04L 12/24* | (2006.01) | |
| *G06F 9/455* | (2018.01) | |
| *G06F 30/18* | (2020.01) | |
| *G06F 8/61* | (2018.01) | |
| *G06F 9/4401* | (2018.01) | |
| *G06F 8/65* | (2018.01) | |
| *G06F 16/951* | (2019.01) | |
| *G06F 111/02* | (2020.01) | |
| *G06F 8/60* | (2018.01) | |
| *H04L 12/26* | (2006.01) | |

(52) U.S. Cl.
CPC .......... *G06F 9/45533* (2013.01); *G06F 30/18* (2020.01); *H04L 41/082* (2013.01); *H04L 41/145* (2013.01); *H04L 41/20* (2013.01); *H04L 67/34* (2013.01); *G06F 8/60* (2013.01); *G06F 9/455* (2013.01); *G06F 16/951* (2019.01); *G06F 2111/02* (2020.01); *H04L 43/50* (2013.01); *H04L 67/20* (2013.01)

(58) Field of Classification Search
CPC .... G06F 17/509; G06F 2217/04; G06F 8/656; G06F 8/60; G06F 8/61; G06F 8/65; G06F 30/18; G06F 9/45533; G06F 9/4411; G06F 9/455; G06F 16/951; G06F 2111/02
USPC ..................................................... 703/13, 21
See application file for complete search history.

(56) References Cited

U.S. PATENT DOCUMENTS

| | | | |
|---|---|---|---|
| 6,639,910 B1 | 10/2003 | Provencher et al. | |
| 6,718,535 B1 | 4/2004 | Underwood | |
| 6,754,175 B1 | 6/2004 | Akinpelu et al. | |
| 7,062,567 B2 | 6/2006 | Benitez et al. | |
| 7,127,713 B2 | 10/2006 | Davis et al. | |
| 7,483,370 B1 | 1/2009 | Dayal et al. | |
| 7,506,338 B2 | 3/2009 | Alpern et al. | |
| 7,979,530 B1 | 7/2011 | Lee | |
| 8,171,466 B2 | 5/2012 | Langen et al. | |
| 8,448,162 B2 | 5/2013 | Ramanathan et al. | |
| 8,943,491 B2 | 1/2015 | Brogan et al. | |
| 9,106,581 B1* | 8/2015 | Mackie .............. H04L 45/00 | |
| 9,524,183 B1* | 12/2016 | Phelan ............ G06F 9/45504 | |
| 9,880,829 B2 | 1/2018 | Katiyar et al. | |
| 2012/0173691 A1 | 7/2012 | Kothe et al. | |
| 2013/0282884 A1 | 10/2013 | Chandrasekaran et al. | |
| 2014/0337674 A1* | 11/2014 | Ivancic ............... H04L 43/50 | |
| | | | 714/43 |
| 2015/0120905 A1* | 4/2015 | Leogrande ............ H04L 43/14 | |
| | | | 709/224 |
| 2016/0013971 A1* | 1/2016 | Caviglia ............... H04L 45/50 | |
| | | | 370/225 |
| 2016/0210135 A1 | 7/2016 | Wroblewski et al. | |
| 2016/0352865 A1* | 12/2016 | Gupta .................. H04L 67/42 | |
| 2017/0163572 A1* | 6/2017 | Cheng ................ H04L 49/3009 | |
| 2017/0168803 A1* | 6/2017 | Katiyar .................. G06F 8/65 | |
| 2018/0139238 A1 | 5/2018 | Schultz et al. | |
| 2018/0239611 A1 | 8/2018 | Hu et al. | |

OTHER PUBLICATIONS

Keti et al. "Emulation of Software Defined Networks Using Mininet in Different Simulation Environments". 2015 6th International Conference on Intelligent Systems, Modelling and Simulation. p. 205-210.*

Dumitras, "Dependable, Online Upgrades in Enterprise Systems", ACM, 835-836, 2009.

Bailey et al, "Trusted Virtual Containers on Demand", ACM, pp. 63-72, 2010.

Handigol et al, "Reproducible Network Experiments Using Container-Based Emulation", ACM, pp. 253-264, 2012.

Pina et al, "Atomic Dynamic Upgrades Using Software Transactional Memory", IEEE, pp. 21-25, 2012.

Burg, "A Generic Approach for Deploying and Upgrading Mutable Software Components", IEEE, pp. 26-30, 2012.

Gederman et al, "Supporting Lock-Free Composition of Concurrent Data Objects: Moving Data between Containers", IEEE, 1866-1878, 2013.

* cited by examiner

SIMULATING A TOPOLOGY OF NETWORK ELEMENTS

RELATED APPLICATIONS

Applicant claims the benefit of priority of prior, provisional application Ser. No. 62/465,121, filed Feb. 28, 2017, the entirety of which is incorporated by reference.

FIELD OF INVENTION

This invention relates generally to data networking, and more particularly, to executing network operation system functions in operating system containers.

BACKGROUND OF THE INVENTION

A network element can include two different planes that are used to process network traffic: a control plane; and a data plane that includes one or more hardware forwarding engines. The data plane receives, processes, and forwards network traffic using various configuration data (e.g., forwarding, security, quality of service (QoS), and other network traffic processing information). The control plane controls these processing functions of the data plane by configuring the data plane, managing data collected by the data plane, monitoring the data plane, and other management functions. The functions for each of the data and control planes are programmed by a software image, the network element operating system, that is stored on the network element. When the network element boots up, the software image is loaded and is used to program the data plane and control plane.

SUMMARY OF THE DESCRIPTION

A method and apparatus of a network element that processes control plane data in a network element is described. In an exemplary embodiment, the device receives control plane data with a network element operating system, where at least a functionality of the network element operating system is executing in a container. In addition, the network element includes a data plane, with a plurality of hardware tables, and the host operating system. Furthermore, the network element processes the control plane data with the network element operating system. The network element additionally updates at least one of the plurality of hardware tables with the process control plane data using the network element operating system.

In another embodiment, a network element receives control plane data with at least one of a plurality of processes of a network element operating system of the network element, wherein the plurality of processes is executing in a plurality of containers. In addition, the network element includes a data plane with a plurality of hardware tables. The network element further processes the control plane data using at least one of the plurality of processes. The network element additionally updates at least one of the plurality of hardware tables with the process control plane data with the at least one of the plurality of processes.

In one embodiment, a network element hitlessly upgrades a network element operating system of a network element. In this embodiment, the network element receives a second image for the network element operating system, where a first image of the network element operating system is executing as a first set of processes in a first container and the first set of processes manages the plurality of hardware tables for the network element. The network element further instantiates a second container for the second image. In addition, the network element starts a second set of processes using at least the second image in the second container. The network element additionally synchronizes state data between the first set of processes and the second set of processes. Furthermore, the network element sets the second set of processes as managing the plurality of hardware tables, and deletes the first container.

In another embodiment, the network element receives a second image for component of the network element operating system, where a first image of the network element operating system component is executing as a first set of processes in a first container. In addition, other components of the network element operating system are executing as third set of processes and at least one other container. The network element further instantiates a second container for the second image and starts a second set of processes using at least the second image in the second container. The network element additionally synchronizes state data between the first set of processes and the second set of processes. In addition, the network element sets the second set of processes is managing the functionally of the component and deletes the first container.

In a further embodiment, a network element installs a device driver used to manage hardware of the network element. In this embodiment, the network element detects, with a network element operating system, the hardware of a data plane of the network element, where at least one component of the network element operating system is executing in a first container as a first set of processes and a host operating system instantiates the first container. The network element further determines a device driver for the hardware and installs the device driver in a kernel of the host operating system. The network element additionally manages the data, with the network element operating system, using the device driver.

In another embodiment, a device simulates a plurality of network elements. In one embodiment, the device receives network topology information for the plurality of simulated network elements. The device further instantiates, with a host operating system of the device, a container for each of the plurality of simulated network elements. The device additionally configures a set of processes for each of the plurality of containers, where each of the set of processes simulates at least one of the plurality of simulated network elements. The plurality of set of processes further implements a network topology represented by the network topology information. The device performs a test of the network topology and saves the results of the test.

Other methods and apparatuses are also described.

BRIEF DESCRIPTION OF THE DRAWINGS

The present invention is illustrated by way of example and not limitation in the Figures of the accompanying drawings in which like references indicate similar elements.

DETAILED DESCRIPTION

Figure 1:
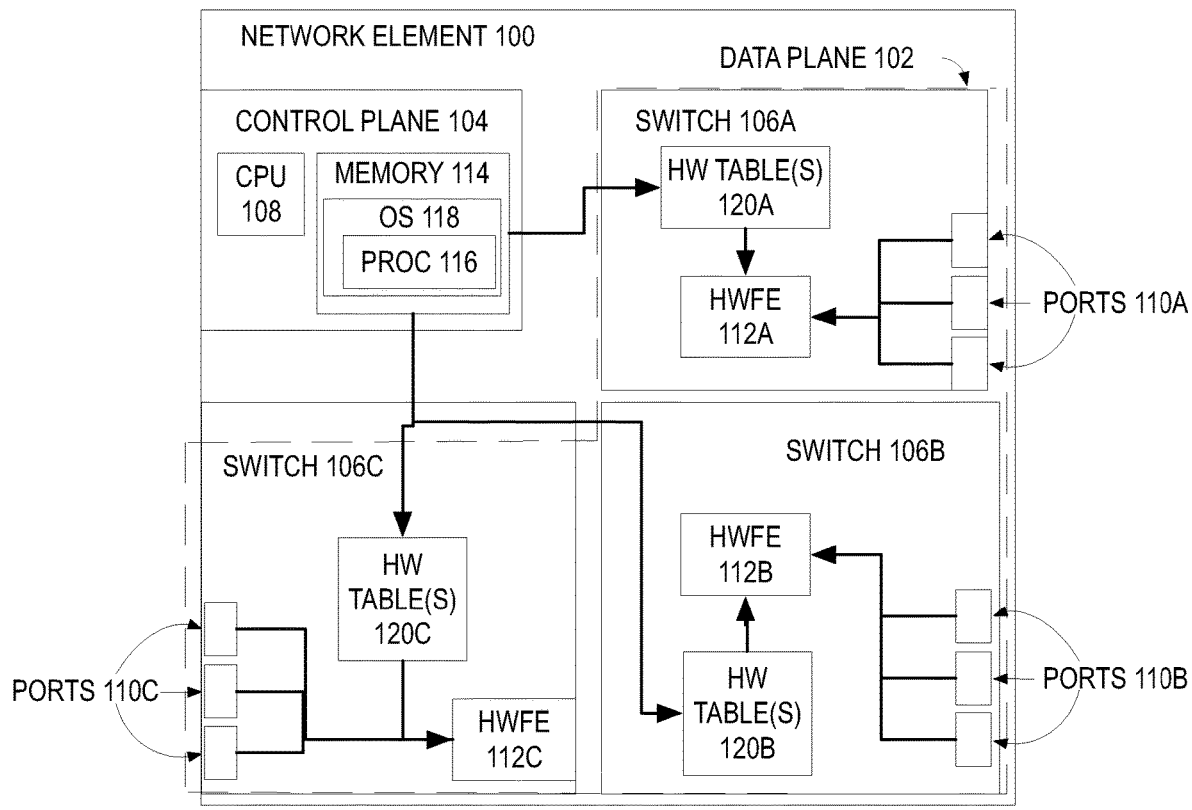
FIG. 1 is a block diagram of one embodiment of a network element that includes a control plane and multiple data planes, with the data plane communicating data to the control plane.

A method and apparatus of a network element that processes control plane data in a network element is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a network element that processes control plane data in a network element is described. In one embodiment, the network element includes a control plane and a data plane that is used to process incoming data by the network element. In this embodiment, the network element includes a host operating system that can be used to instantiate one or more containers, where the containers are used to execute one or more network element operating system processes. Alternatively, the containers can be each instantiated by another container or another mechanism. These network element operating system processes, in turn, process any incoming data that is identified as control plane data and program hardware tables with associated hardware table updates. In this embodiment, the network element operating system, which executes in the one or more containers, controls the processing of the control plane data. Therefore, the network element operating system controls and manages the operation of the network element, even though the network element includes a host operating system that may be from a different manufacturer than the one of the network element operating system.

By having the network element operating system execute in a container, the network element operating system acts as an application of the host operating system. For example and in one embodiment, there can be processes for quality of service functions, access control lists management (or other types of security), policy service, fan agent, light emitting diode agent, temperature sensor agent, database service, management service(s), processes to support networking protocols (e.g. spanning tree protocol (STP), routing protocols (e.g. such as routing information protocol (RIP), border gateway protocol (BGP), open shortest path first (OSPF) protocol, intermediate system-intermediate system (IS-IS) protocol, interior gateway routing protocol (IGRP), enhanced IGRP (EIGRP), protocol independent multicast (PIM), distance vector multicast routing protocol (DVMRP), and any/or other type or unicast or multicast routing protocol), Multiprotocol Label Switching (MPLS), and/or other types of networking protocols), network flow management applications (e.g., openflow, directflow), process manager, and/or other types of processes for other types of functionality of the network element.

In another embodiment, the network element operating system is partitioned into multiple containers, where each of the containers is used to execute one or more processes for different functionalities and/or components of the network element operating system. For example and in one embodiment, there can be multiple containers and processes for the functions listed above.

Because the network element operating system can be containerized into one or more different containers on top of a host operating system, upgrading of the network element operating system, either in whole or in part, can be performed hitlessly. In one embodiment, if the network element operating system is executed in one container, a new container can be instantiated that is used to perform a hitless upgrade to the network element operating system. A hitless upgrade can be performed by instantiating a new container for the network element operating system, instantiate the one or more processes for this container, synchronizing a state between the current network element operating system processes and the new network element operating system processes in the new container, and switching over control from the current network element operating system processes to the network element operating system processes in the new container.

If the network element operating system is executing in multiple containers for different components of the network element operating system, one or more of these components can be upgraded without affecting the execution of processes in other containers. A hitless upgrade can be performed for the network element operating system component by instantiating a new container for this component, instantiate the one or more processes of the component for this container, synchronizing a state between the current component processes and the new component processes in the new container, and switching over control from the current component processes to the component in the new container. Alternatively, the new component process can rebuild a state based on at least the state of the old component, where control from the current component is switched over to the new component in the new container.

In one embodiment, a containerized network element operating system programs updates to the hardware tables in the data plane using a device driver. Because the host operating system does not know, a priori, which network element operating system will eventually be running on the network element, the network element may not be able to program the hardware tables of the network element. Instead, the network element operating system can dynamically install a device driver in the kernel of the host operating system. In this embodiment, the network element operating system probes the hardware of the data plane (e.g., a type of ASIC used as a hardware forwarding engine for the data plane) and installs the device driver in the kernel of the host operating system. With the installed device driver, the containerized network element operating system can program updates to the hardware tables in the data plane.

In a further embodiment, multiple containers of a host operating system for a device can be used to simulate a network topology of network elements. In this embodiment, the host operating system of a device can instantiate multiple containers, were each of the containers is used to execute a set of processes to simulate one or more network elements for a given configuration and network topology. Alternatively, each of these multiple containers can be instantiated by another container or some other mechanism.

FIG. 1 is a block diagram of one embodiment of a network element 100 that includes a control plane 104 and a data plane 102, with the data plane 102 communicating data to the control plane 104. In one embodiment, the data plane 102 receives, processes, and forwards network data using various configuration data (e.g. packet forwarding (routing, switching, or another type of packet forwarding), security, quality of service (QoS), and other network traffic processing information). For example, for each received packet of the network traffic, the data plane determines a destination address of that packet, looks up the requisite information for that destination in one or more hardware tables 120A-C stored in the data plane, and forwards the packet out the proper outgoing interface. The data plane 102 includes multiple switches 106A-C that can each receive, process, and/or forward network traffic. In one embodiment, each switch 106A-C includes a hardware forwarding engine 112A-C and ports 110A-C, respectively. In one embodiment, the network element 100 can be a switch, router, hub, bridge, gateway, etc., or any type of device that can communicate data packets with a network. In one embodiment, the network element 100 can be a virtual machine.

In one embodiment, the control plane 104 includes central processing unit (CPU) 108. As discussed herein, CPU 108 is interchangeably referred to as a control plane processor of network element 100. The CPU 108 is used to process information for the control plane 104 and write configuration data for hardware forwarding engines 112A-C in the switches 106A-C. The information processed by CPU 108 includes, for example, control plane data corresponding to a plurality of different classes of control plane traffic, such as routing protocol messages, routing table messages, routing decisions messages, route update messages, unresolved traffic messages, L2 protocol messages, link aggregation control protocol messages, link layer state updates messages (e.g., spanning tree messages), link state update messages (e.g., link aggregation control protocol messages for a link aggregation group, bidirectional forwarding detection messages, etc.), exception packets that cannot be dealt with in hardware (e.g., router alerts, transmission time interval messages, maximum transmission size exceeded messages, etc.), program messages (e.g., packets from a controller instructing the programming of a network element), messages for routing table misses, time control messages (e.g., precision time protocol messages), messages for packets marked as being of interest for snooping (e.g., access control list logging and port mirroring messages), messages used to collect traffic diagnostics, address resolution messages (ARP) requests and replies, neighbor solicitation requests and replies, general communication to the control plane of the networking device, etc. CPU 108 processes the control plane network data to perform control management updates and/or respond with control message responses (e.g., routing decisions, protocol updates, traffic resolutions, etc.).

In one embodiment, the control plane 104 further includes memory 114 that includes operating system 118 that is executing various processes. In this embodiment, the processes 116 are processes that execute the functionality of the control plane 104. In one embodiment, there can be processes 116 for quality of service, access control lists management (or other types of security), policy service, fan agent, light emitting diode agent, temperature sensor agent, database service, management service(s), processes to support networking protocols (e.g. STP, routing protocols (e.g. such as RIP, BGP, OSPF, IS-IS, IGRP, EIGRP, PIM, DVMRP, and any/or other type or unicast or multicast routing protocol), MPLS, and/or other types of networking protocols), network flow management applications (e.g., openflow, directflow), process manager, and/or other types of processes for other types of functionality of the network element 100.

In one embodiment, the data plane 102 receives, processes, and forwards network data, including control plane network data, using various configuration data (e.g., forwarding, security, quality of service (QoS), and other network traffic processing information). The data plane 102 includes multiple switches 106A-C that can each receive, process, and/or forward network traffic. Each of the switches 106A-C includes multiple ports 116A-C that are used to receive and transmit network data.

In one embodiment, for each received unit of network data (e.g., a packet), the data plane 102 determines a destination address for the network data, looks up the requisite information for that destination in one or more tables stored in the data plane, and forwards the data out the proper outgoing interface, for example, one of the interface devices 106A-C. In one embodiment, each switch 106A-C includes one or more hardware forwarding engines (HWFE(s)) 112A-C and ports 116A-C, respectively. Each hardware forwarding engine 112A-C forwards data for the network element 100, such as performing routing, switching, or other types of network forwarding or processing.

In one embodiment, for each received unit of control plane data, the data plane 102 forwards the control plane network data to the CPU 108 (e.g., the control plane processor). In one embodiment, the control plane 104 gathers configuration data for the hardware forwarding engines 112A-C in control plane network data messages from different sources (e.g., locally stored configuration data, via a command line interface, or other management channel (e.g., SNMP (Simple Network Management Protocol), Simple Object Access Protocol (SOAP), Representational State Transfer type Application Programming Interface (RESTful API), Hypertext Transfer Protocol (HTTP), HTTP over Secure Sockets layer (HTTPs), Network Configuration Protocol (NetConf), Secure Shell (SSH), and/or another management protocol) and pushes this configuration data to the hardware forwarding engines 112A-C.

The data plane 102 further includes hardware tables 120A-C that are one or more tables used to configure the processing of the incoming handled by the hardware forwarding engines 112A-C. In one embodiment, the hardware tables 120A-C are used to store configuration data, monitoring data, reporting data, statistics, and any other data the hardware forwarding engine uses or collects. In one embodiment, the hardware tables 120A-C can include a routing table, MAC table, ACL, and other tables. For example and in one embodiment, the routing table stores routing table entries which may be produced by any of the running protocols known in the art such as RIP, BGP, OSPF, IS-IS, IGRP, EIGRP, PIM, DVMRP, and any/or other type or unicast or multicast routing protocol known in the art. The routing table entries may be used to forward packets that are encoded with one of the address families known in the art such as IPv4 unicast, IPv6 unicast, IPv4 multicast, or IPv6 multicast. The MAC table is a table of MAC addresses known to the hardware forwarding engine and Virtual Local Area Network (VLAN)s and ports that these MAC address are associated with. In one embodiment, the MAC table is used for layer 2 forwarding. In another embodiment, the MAC table records a MAC address and VLAN and an associated tunnel interface. This tunnel may be a Virtual eXtensible LAN (VXLAN) tunnel, a Generic Routing Encapsulation (GRE) tunnel, an L2TP tunnel, an Internet Protocol (IP)-in-IP tunnel, a Multiprotocol Label Switching (MPLS) label, or one of any number of tunneling formats known in the art. In one embodiment, the ACL consists of an ordered series of rules, where each rule has a match criterion and action. In this embodiment, the ACL 206 is applied to the network data against these rules in order, and taking the action of the first rules that matches. In one embodiment, the other tables are set of one or more tables that is used to store statistics, monitoring data, other configuration data, stored events, management data, and/or other data the hardware forwarding engine uses or collects.

Containerized Network Element Operating System

Figure 2:
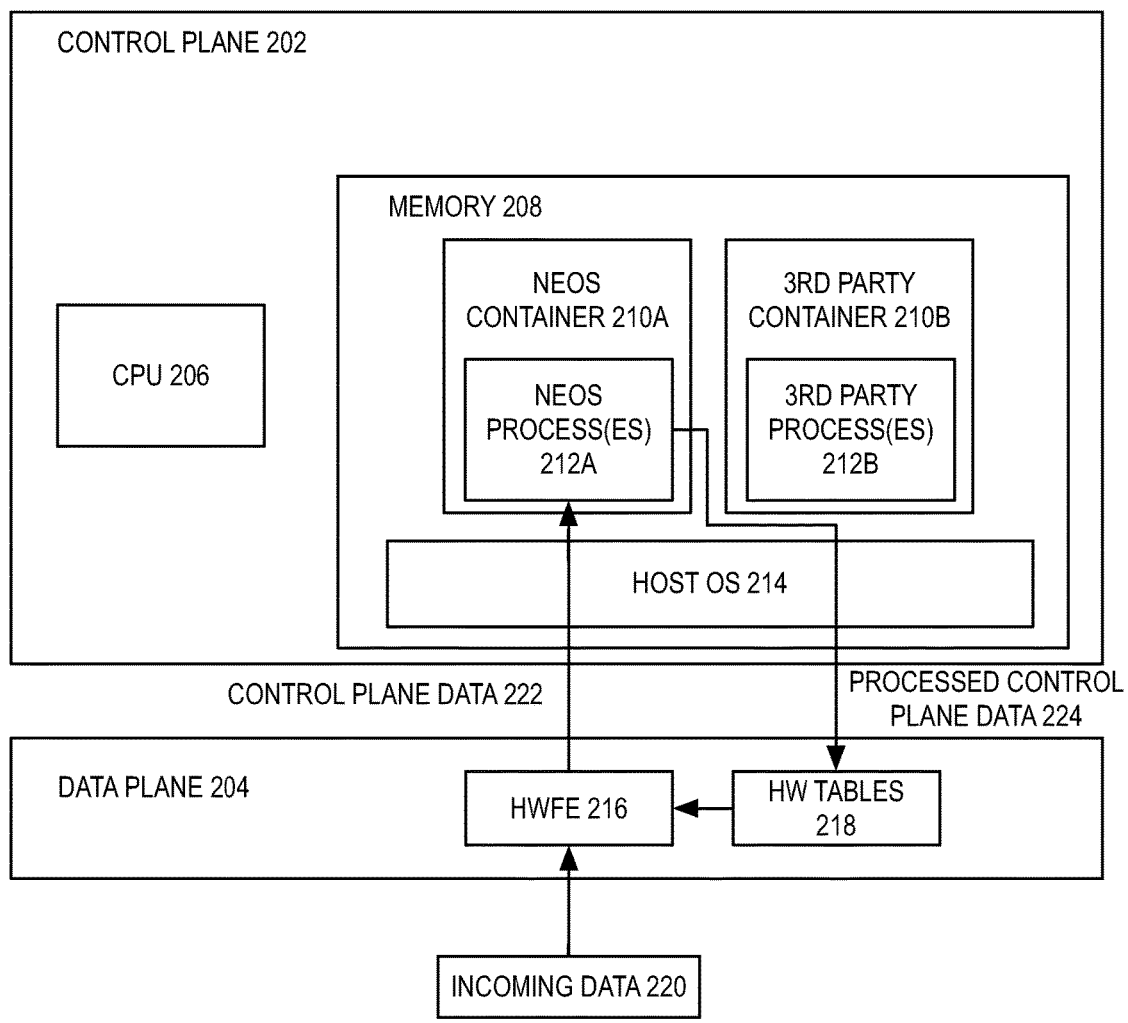
FIG. 2 is a block diagram of one embodiment of a network element with a network element operating system executing within a container.

FIG. 2 is a block diagram of one embodiment of a network element 200 with a network element operating system executing within a container 210A. In FIG. 2, network element 200 includes a control plane 202 coupled to a data plane 204. In one embodiment, the data plane 204 includes one or more hardware forwarding engines 216 and one or more hardware tables 218. In one embodiment, the hardware forwarding engines 216 are the hardware forwarding engines as described in FIG. 1 above. Furthermore, in this embodiment, the hardware tables 218 are the hardware tables as described in FIG. 1 above. In one embodiment, the data plane 204 processes the incoming data 220 using the hardware forwarding engines 216 according to the data in the hardware tables 218. In this embodiment, the hardware forwarding engines 216 decide whether to forward the data to a next hop, forward the data to the control plane 202, and/or further process the data. If the hardware forwarding engine 216 determines that the incoming data is control plane data, the hardware forwarding engine 216 forwards this control plane data 222 to the network element operating system process(es) 212A, where the network element operating system process(es) 212A processes this control plane data 222. If the incoming data 220 is data plane data, the hardware forwarding engines 216 can determine the next hop for this data and/or perform further processing of this data (e.g., apply a quality service, perform traffic shaping, process with relevant ACLs, and/or other processing).

The control plane 202, in one embodiment, includes a CPU 206 and memory 208. In this embodiment, the memory 208 includes a host operating system 214 and two containers 210A-B. Each of the containers 210A-B can each be instantiated by the host operating system 214, another container, or some other mechanism. In one embodiment, a container 210A-B is a namespace instance of an operating system level virtualization. In this embodiment, the container 210A-B is used for deploying and running processes without launching an entire virtual machine for each of these processes. Instead, these multiple isolated containers are run on a single control host operating system 214 and access the kernel of the host operating system 214. Because these containers 210A-B share the same host operating system kernel as the network element 200, the containers can be more efficient than virtual machines, which require separate operating system instances, including a kernel instantiation for each of the virtual machines. In addition, each virtual machine is required to be run on a hypervisor. In one embodiment, the containers 210A-B do not require a separate kernel or a hypervisor to execute a process within this container. The containers 210A-B include the components used to run the desired software, such as files, environmental variables, data, metadata, and/or libraries. In one embodiment, the containers 210A-B are compatible with a DOCKER type of containers. In this embodiment, the host operating system 214 can additionally manage hardware of the network element that is different from the networking functions of the network element 200. For example and in one embodiment, the network element 200 may have other hardware and/or other functions (e.g., storage systems, security hardware, different hypervisors, and/or other types of functions) that are being managed by the host operating system. In one embodiment, this architecture decouples the network hardware and services with the network element operating system from the host operating system.

As described above, the memory 208 includes the network element operating system container 210A and further can include a third-party container 210B. In one embodiment, the network element operating system container 210A is an isolated namespace used to execute the network element operating system process(es) 212A, where the network element operating system process(es) 212A can be used to manage the data stored in the hardware tables 218 and/or other management functionalities of the network element 200. By executing the network element operating system process(es) 212A in the network element operating system container 210A, a network element operating system can be run on a network element that is from a different manufacturer than the one that produced the network element operating system. For example and in one embodiment, a network element operating system from one manufacturer can be run on a white box network element that has a different manufacturer. Thus, instead of a network element operating system acting as the host operating system for the network element 200, the network element operating system acts as an application executing on the network element 200.

In one embodiment, the network element operating system process(es) 212A receive the control plane data 222 from the hardware forwarding engines 216 via the host operating system 214. The network element operating system process(es) 212A receive the control plane data 222, processes the control plane data 222, and programs the processed control plane data 224 to the hardware tables 218 of the data plane 204. In this embodiment, by programming updates to the hardware tables 218, the network element operating system process(es) 212A controls how the data plane 204 of the network element performs.

As with a network element operating system executing natively on a network element 200, the network element operating system can be remotely managed. In one embodiment, the network element 200 includes a management interface (not illustrated) that is used by remote client to manage and/or configure the operations of the network element 200. In this embodiment, because the network operating system is executing as a container on top of a host operating system 214, a mechanism is needed to allow the network element operating system process(es) to communicate management data with the remote client. In one embodiment, this can be done either by the network element operating system being private, or isolated, and the host operating system 214 visible to the remote client, the network element operating system visible to the remote client and the host operating system 214 being isolated, or both the network element operating system and the host operating system 214 each visible to the remote client.

In one embodiment, the network operating system process(es) 212A are private to a remote client, because a remote client cannot access these process(es) 212A via a management interface. In this embodiment, the network 200 includes a private network between the host operating system 214 and the network element operating system process(es) 212A that is used to communicate management data with the network element operating system process(es) 212A. Thus, a remote client wishing to communicate with the management processes (e.g., via a command line interface with the network element operating system process(es) 212A) communicates with the management interface of the network element 200. In this embodiment, management data that is received on the network element management interface is forwarded over the private network to the network element operating system process(es) 212A, where the network element operating system process(es) 212A process this management data and returns the output (if appropriate). (In one embodiment, the host operating system 214 implements a Network Address Translation (NAT) service and accesses specific processes in the network element operating service process(es) 212A by mapping ports attached to some or all of the network element operating service process(es) 212A (e.g. a port for SSH). In this embodiment, a network administrator can access the network element operating service process(es) 212A using SSH, SNMP, or another type of management mechanism.

In an alternate embodiment, the host operating system 214 is isolated and the network element operating system process(es) 212A is available to a remote client and further manages the management interface. In this embodiment, the network element 200 bridges the physical management interface to a virtual interface inside the network element operating system container 210A. Thus, the network element operating system process(es) 212A initially receives the management data (e.g. CLI commands or other management requests) and forwards any results from this management data back to the remote client by the internal bridge of the network element and the management interface. In this embodiment, the host operating system 214 is available via console (e.g., a physical console interface or console server).

In a further embodiment, both the host operating system 214 and the network element operating system process(es) 212A are visible to a remote client. In this embodiment, each of the host operating system 214 and the network element operating system process(es) 212A would have different interfaces assigned to them that are accessible by the remote client. For example and in one embodiment, a MAC VLAN interface is used to expose to reachable endpoints sharing the same physical port for the host operating system 214 and the network element operating system process(es) 212A.

In one embodiment, there can be other containers for other processes that are instantiated, with executing processes, that may or may not be from the same vendor as the network element operating system or the host operating system 214. In one embodiment, a third-party process 212B can be executing within a third-party container 210B concurrently with the network element operating system process(es) 212A. In this embodiment, the third-party container 210B can be used to implement other functions of the network, such as other types of management for the network element 200 that is not currently be handled by the network element operating system process(es) 212A. Thus, the network administrator could choose a white box network element 200 from one vendor, installing a host operating system 214 from a second vendor, have this white box network element 200 run a network element operating system from a third vendor in a container 210A that are executing the network element operating system process(es) 212A, and have a third-party application from a fourth vendor executing in different container 210B.

Figures 3A, 3B:
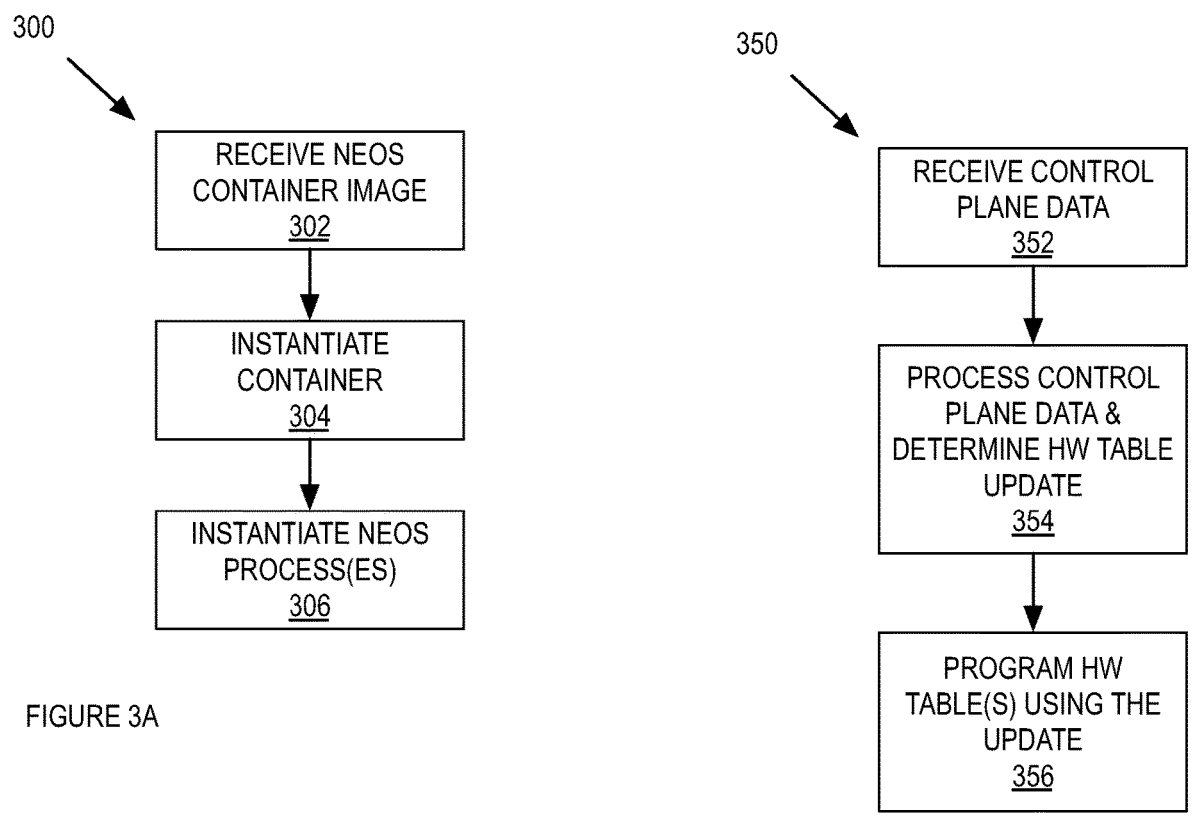
FIGS. 3A-B are flow diagrams of embodiments of a process to instantiate a container for a network element operating system and to process control plane data using network operating system process(es) within this container.

FIGS. 3A-B are flow diagrams of embodiments of processes to instantiate a container for a network element operating system and to process control plane data using network operating system process(es) within this container. In FIG. 3A, process 300 begins by receiving a network element operating system container image at block 302. In one embodiment the network element operating system container image is an image that can be used to instantiate one or more processes that are used by a network element operating system to run and manage a network element. In particular, the network element operating system can be used to program and maintain a data plane of the network element, so that the network element can process and forward data that the network element receives. At block 304, process 300 instantiates a container that will be used for the network element operating system processes. In one embodiment, the instantiated container provides an operating system level virtualization for these processes. Process 300 instantiates the network element operating system process(es) at block 306. In one embodiment, these network element operating system process(es) are used by the network element operating system to run and manage this network element.

In one embodiment, with the network element operating system process(es) executing in the network element operating system container, this network element operating system can be used to manage and update a data plane of the network element. FIG. 3B is a flow diagram of one embodiment of a process 350 to process control plane data and program updates to the hardware tables of a data plane of a network element. In FIG. 3B, process 350 begins by receiving control plane data from a hardware forwarding engine of the data plane of the network element at block 352. In one embodiment, control plane data is data that is to be processed by the control plane (e.g., routing protocol updates, address updates, configuration data, statistics, and/or other data processed by the control plane) as described above. At block 354, process 350 processes the control plane data and determines a hardware table update. In one embodiment, the hardware table update could be for a routing table, MAC address table, ACL list, and/or another update to another table. Process 350 programs the hardware table(s) using the hardware table update at block 356. In one embodiment, by the network element operating system process(es) programming the hardware table using the hardware table updates, the network element operating system process(es) can manage and control the data plane of the network element.

Figure 4:
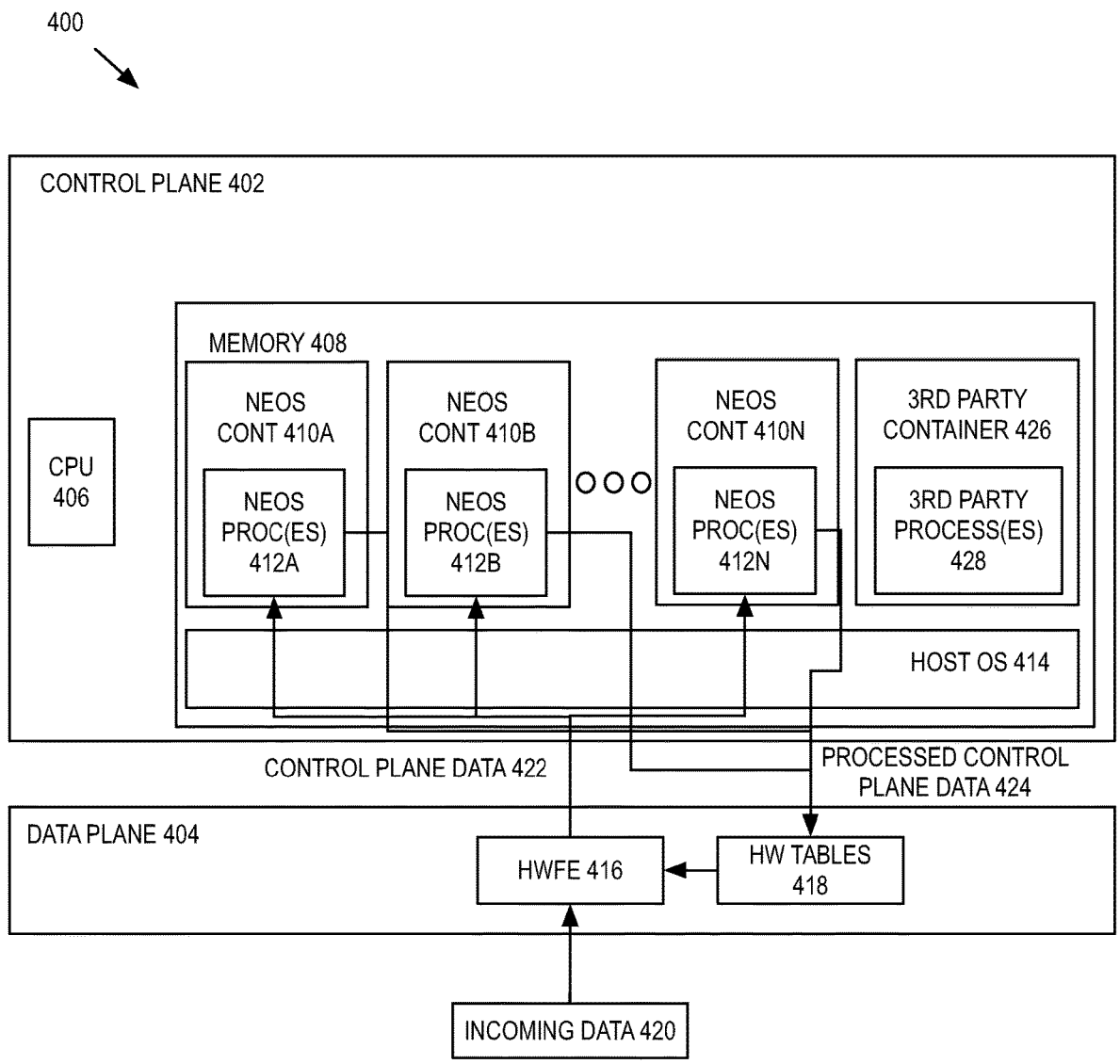
FIG. 4 is block diagram of one embodiment of a network element with a network element operating system executing within multiple containers.

FIG. 4 is block diagram of one embodiment of a network element 400 with a network element operating system executing within multiple containers 410A-N. In FIG. 4, network element 400 includes a control plane 402 coupled to a data plane 404. In one embodiment, the data plane 404 includes one or more hardware forwarding engines 416 and one or more hardware tables 418. In one embodiment, the hardware forwarding engines 416 are the hardware forwarding engines as described in FIG. 1 above. Furthermore, in this embodiment, the hardware tables 418 are the hardware tables as described in FIG. 1 above. In one embodiment, the data plane 404 processes the incoming data 420 using the hardware forwarding engines 416 according to the data in the hardware tables 418. In this embodiment, the hardware forwarding engines 416 decide whether to forward the data to a next hop, forward the data to the control plane 402, and/or further process the data. If the hardware forwarding engine 416 determines that the incoming data is control plane data, the hardware forwarding engine 416 forwards this control plane data 422 to the network element operating system process(es) 412A, where the network element operating system process(es) 412A processes this control plane data 422. If the incoming data 420 is data plane data, the hardware forwarding engines 416 can determine the next hop for this data and/or perform further processing of this data (e.g., apply a quality service, perform traffic shaping, process with relevant ACLs, and/or other processing).

The control plane 402, in one embodiment, includes a CPU 406 and memory 408. In this embodiment, the memory 408 includes a host operating system 414 and containers 410A-N that are each instantiated by the host operating system 414, another container, or some other mechanism. In one embodiment, a container 410A-N is a namespace instance of an operating system level virtualization. In this embodiment, the container 410A-N is used for deploying and running processes without launching an entire virtual machine for each of these processes. Instead, these multiple isolated containers are run on a single control host operating system 414 and access the kernel of the host operating system 414. Because these containers 410A-N share the same host operating system kernel as the network element 400, the containers can be more efficient than virtual machines, which require separate operating system instances. The containers 410A-N include the components used to run the desired software, such as files, environmental variables, data, metadata, and/or libraries. In one embodiment, the containers 410A-B are compatible with the DOCKER types of containers.

As described above, the memory 408 includes the network element operating system containers 410A-N and further can include a third-party container 426 with a third-party process 428 that executes within the third-party container 426. In one embodiment, the functionalities of the network element operating system are split into multiple containers 410A-N, where there one or more network element operating system process(es) 412A-N per container 410A-N. In this embodiment, each of the network element operating system containers 410A-N is an isolated namespace used to execute the network element operating system process(es) 412A-N, where the network element operating system process(es) 412A-N can be used to manage the data stored in the hardware tables 418 and/or other management functionalities of the network element 400. By executing the network element operating system process(es) 412A-N in the network element operating system containers 410A-N, a network element operating system collectively can be run on a network element that is from a different vendor than the one that produced the network element operating system. For example and in one embodiment, a network element operating system from one manufacturer can be run on a white box network element that has a different manufacturer. Thus, instead of a network element operating system acting as the host operating system for the network element 400, the network element operating system acts as an application executing on the network element 400.

In FIG. 4, with the functionality of the network element operating system split across multiple network element operating system process(es), each of the processes 412A-N in the different containers 410A-N can act like a separate application and can be upgraded separately. In one embodiment, one of the containers 410A-N is used to execute a database process that receives and stores state data of the network element operating system processes 412A-N. in this embodiment, the database process is used to store various state data that is further used by the control plane to manage the network element 400.

In a further embodiment, each of the network element operating system processes 412A-N can share libraries from one or more layers for image compatibility and reduced image size. In this embodiment, these libraries (or other types of binaries) are shared even when the network operating system is partitioned among multiple containers 410A-N. For example and in one embodiment, a routing container will have layers, such as a routing layer where a routing process executes, and a basic layer that is utilized by the routing layer. In a further example, hardware container will have the layers of the hardware agents and the basic layer. In these examples, the binary for the basic layer used by the routing and the hardware containers is the same binary, which leads to a reduced image size for these network element operating system processes it is also used for the image compose ability for these processes.

In a further embodiment, these multiple container 410A-N instances are used to manage different aspects of the network element. For example and in one embodiment, there can be processes 412A-N for the quality of service, access control lists management (or other types of security), policy service, fan agent, light emitting diode agent, temperature sensor agent, database service, management service(s), processes to support networking protocols (e.g. STP, routing protocols (e.g. such as RIP, BGP, OSPF, IS-IS, IGRP, EIGRP, PIM, DVMRP, and any/or other type or unicast or multicast routing protocol), MPLS, and/or other types of networking protocols), network flow management applications (e.g., openflow, directflow), process manager, and/or other types of processes for other types of functionality of the network element 400.

In one embodiment, each of the network element operating system processes 412A-N can open one or more sockets (e.g., a RAW socket, another type of socket, or communication port) on the ports in the kernel of the host operating system and listen for the type of data that process is interested in. In another embodiment, a platform driver can be installed into the kernel of the host operating system that offers a different interface to the associated process. In a further embodiment, if a service of one of the network element operating service process(es) 212A-N is over Transport Control Protocol (TCP), this service will terminate inside the container.

Figures 5A, 5B:
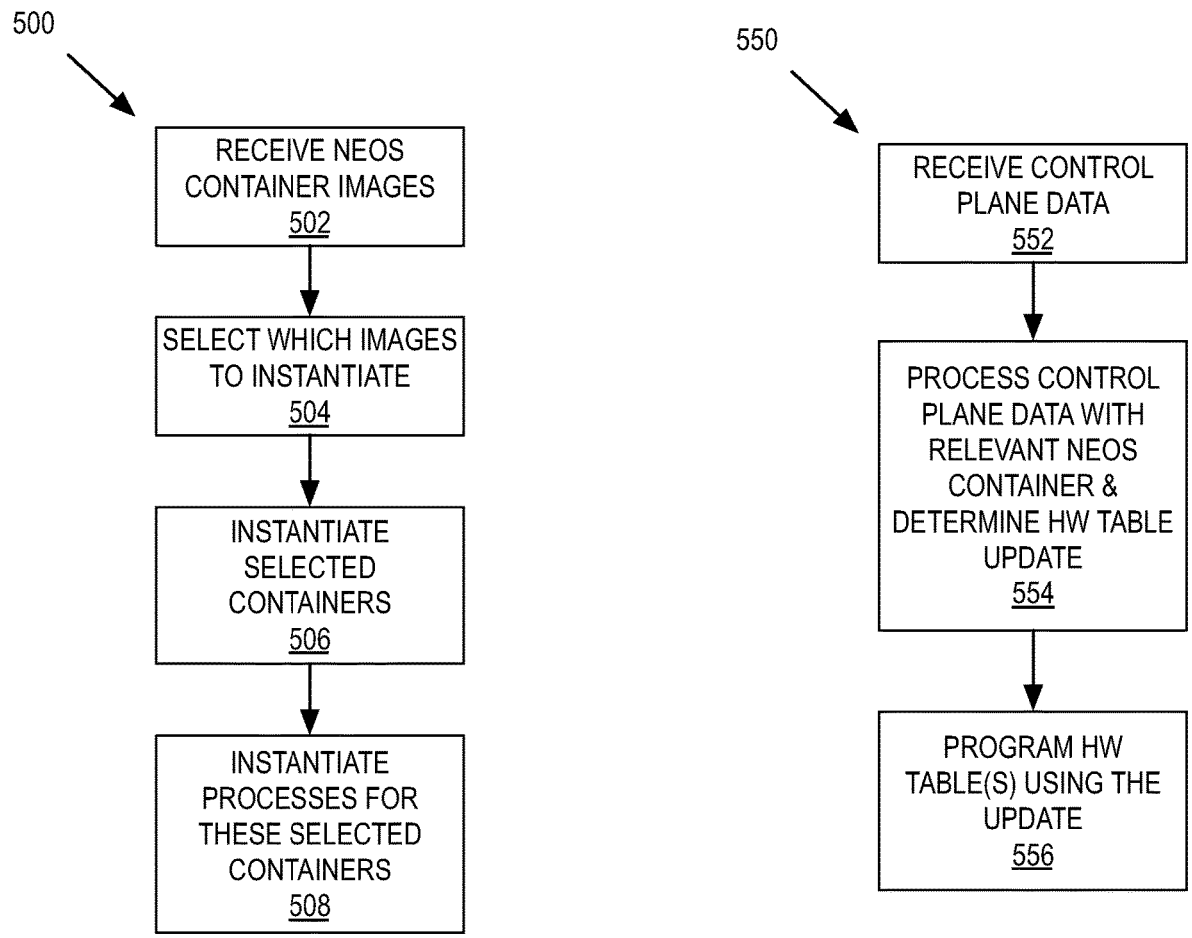
FIGS. 5A-B are flow diagrams of embodiments of a process to instantiate multiple containers for a network element operating system and to process control plane data using network operating system process(es) within these containers.

FIGS. 5A-B are flow diagrams of embodiments of processes to instantiate multiple containers for a network element operating system and to process control plane data using network operating system process(es) within these containers. In FIG. 5A, process 500 receives the network element operating system container images at block 502. In one embodiment, the network element operating system container images are images that can be used to instantiate one or more processes that collectively are used by a network element operating system to run and manage a network element. In particular, the network element operating system can be used to program and maintain a data plane of the network element, so that the network element can process and forward data that the network element receives. In this embodiment, these images can include libraries that are used by multiple processes. At block 504, process 500 selects which images to instantiate. In this embodiment, process 500 determines which images to instantiate based on the configuration for the network element. The network element may not be configured to run each possible service that is available within the network element operating system. Thus, process 500 selects the images further configured services, agents, and/or other processes that the network element is configured to do. At block 506, process 500 instantiates the selected containers for these configured services, agents, and/or processes. In one embodiment, the configuration of the network element includes which of these services, agents, and/or processes are to be executed and which of the instantiated containers. Process 500 instantiates processes for the configure services, agents, and/or processes in the appropriate selected containers at block 508.

In one embodiment, with the network element operating system process(es) executing in the network element operating system containers, this network element operating system can be used to manage and update a data plane of the network element. FIG. 5B is a flow diagram of one embodiment of a process 550 to process control plane data and program updates to the hardware tables of a data plane of a network element. In FIG. 5B, process 550 begins by receiving control plane data from a hardware forwarding engine of the data plane of the network element at block 552. At block 554, process 550 processes the control plane data and determines a hardware table update. Process 550 programs the hardware table(s) using the hardware table update at block 556. In one embodiment, by the network element operating system process(es) programming the hardware table using the hardware table updates, the network element operating system process(es) can manage and control the data plane of the network element.

Hitless Upgrades of a Containerized Network Operating System

Periodically, the software image of a network element is updated. For example, the network element can be upgraded to a new software image to add new features and/or fix problems with the current software image. Alternatively, the network image can be downgraded to a previous version of the software image. To change the software image, the network element loads the new software image, marks this new software image as the current software image, and reboots the network element. As the network element boots up, the new software image is loaded and programs the control and data planes of the network element.

A problem with this way of upgrading or downgrading the software image is that, by rebooting the network element, the network element is inoperable for a relatively long time. For example, rebooting the network element can cause the network element to be off-line for upwards of five minutes. During this off-line time, the data processing functions of the network element are inoperable. This can lead to an interruption of data networking services that rely on the network element. If there can be a hitless upgrade for a network element, where the network element is not rebooted, then the data processing of the data plane is not interrupted.

Figure 6:
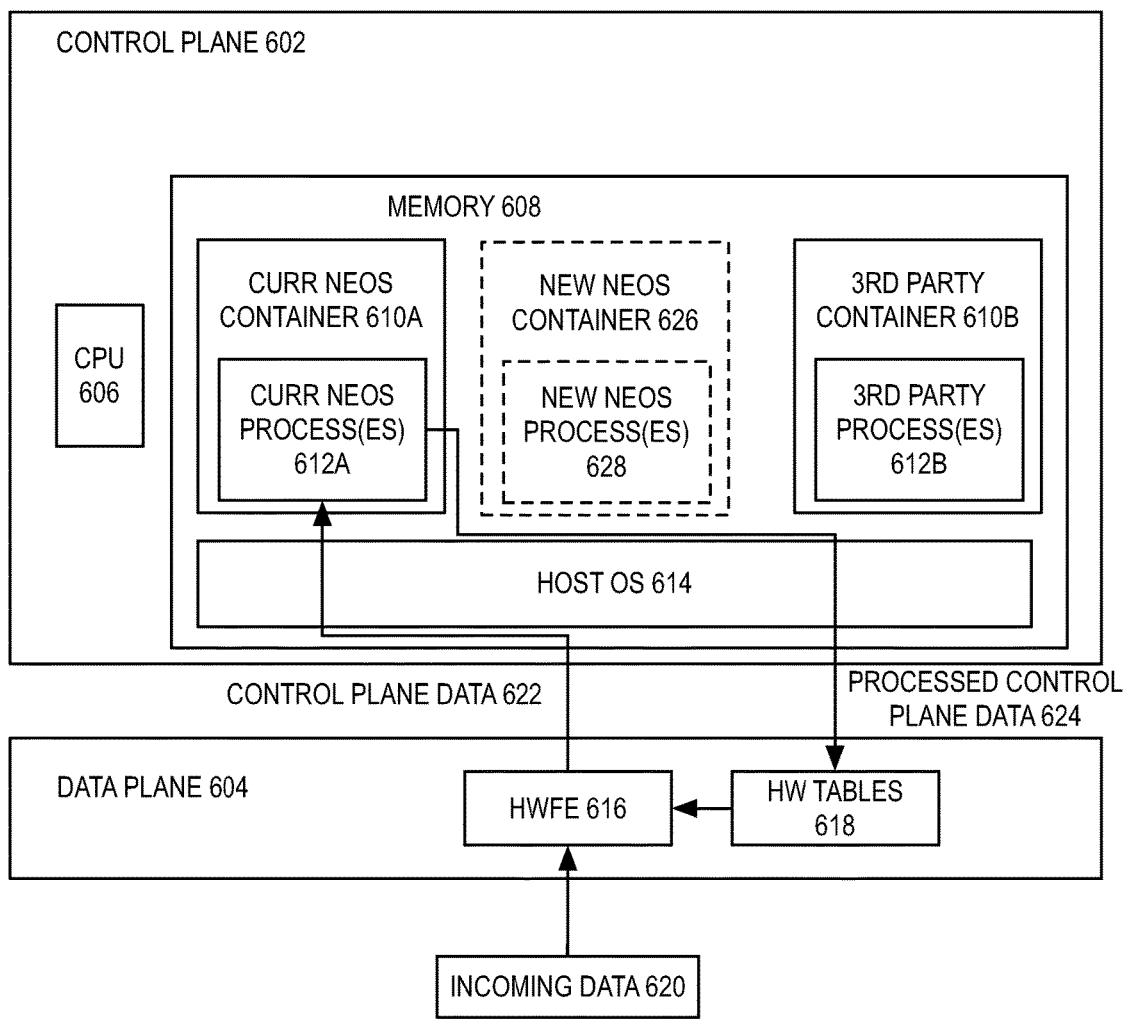
FIG. 6 is a block diagram of one embodiment of a network element performing a hitless upgrade for a network element operating system executing within a container of a host operating system.

FIG. 6 is a block diagram of one embodiment of a network element 600 performing a hitless upgrade for a network element operating system executing within a container 610A of a host operating system 614. In FIG. 6, network element 600 includes a control plane 602 coupled to a data plane 604. In one embodiment, the data plane 604 includes one or more hardware forwarding engines 616 and one or more hardware tables 618. In one embodiment, the hardware forwarding engines 616 are the hardware forwarding engines as described in FIG. 1 above. Furthermore, in this embodiment, the hardware tables 618 are the hardware tables as described in FIG. 1 above. In one embodiment, the data plane 604 processes the incoming data 620 using the hardware forwarding engines 616 according to the data in the hardware tables 618. In this embodiment, the hardware forwarding engines 616 decide whether to forward the data to a next hop, forward the data to the control plane 602, and/or further process the data. If the hardware forwarding engine 616 determines that the incoming data is control plane data, the hardware forwarding engine 616 forwards this control plane data 622 to the network element operating system process(es) 612A, where the network element operating system process(es) 612A processes this control plane data 622. If the incoming data 620 is data plane data, the hardware forwarding engines 616 can determine the next hop for this data and/or perform further processing of this data (e.g., apply a quality service, perform traffic shaping, process with relevant ACLs, and/or other processing).

The control plane 602, in one embodiment, includes a CPU 606 and memory 608. In this embodiment, the memory 608 includes a host operating system 614 and two containers 610A-B that are each instantiated by the host operating system 614, another container, or some other mechanism. In one embodiment, a container 610A-B is a namespace instance of an operating system level virtualization. In this embodiment, the container 610A-B is used for deploying and running processes without launching an entire virtual machine for each of these processes. Instead, these multiple isolated containers are run on a single control host operating system 614 and access the kernel of the host operating system 614. Because these containers 610A-B share the same host operating system kernel as the network element 600, the containers can be more efficient than virtual machines, which require separate operating system instances. The containers 610A-B include the components used to run the desired software, such as files, environmental variables, data, metadata, and/or libraries. In one embodiment, the containers 610A-B are compatible with the DOCKER types of containers. As described above, the memory 608 includes the network element operating system container 610A and further can include a third-party container 610B with a third-party process 612B that executes within the third-party container 610B. In one embodiment, the network element operating system container 610A is an isolated namespace used to execute the network element operating system process(es) 612A, where the network element operating system process(es) 612A can be used to manage the data stored in the hardware tables 618 and/or other management functionalities of the network element 600. By executing the network element operating system process(es) 612A in the network element operating system container 610A, a network element operating system can be run on a network element that is from a different vendor than the one that produced the network element operating system. For example and in one embodiment, a network element operating system from one vendor can be run on a white box network element that has a different vendor. Thus, instead of a network element operating system acting as the host operating system for the network element 600, the network element operating system acts as an application executing on the network element 600.

In one embodiment, with a containerized network element operating system in one or more containers, a hitless upgrade can be performed by instantiating a new container 626 for the network element operating system, instantiate the one or more processes 628 for this container, synchronizing a state between the current network element operating system processes 628 and the new network element operating system processes 612A in the new container, and switching over control from the current network element operating system processes 612A to the network element operating system processes 628 in the new container 626. In this embodiment, the switching over to the new container 626 can include the new network element operating system processes 628 taking over control of a management interface or management network used by the network element operating system processes 612A and stopping the current network element operating system processes 612A and deleting the current network element operating system containers 610A. In one embodiment, the state of the network element operating system being upgraded can be stored outside the affected container in other containers, such as a database container, or in a shared memory of an underlying system. In a further embodiment because the container itself is stateless, the new container and associated process(es) can instantly take over the processing of the relevant control plane data without a hit to the data processing of incoming data.

Figure 7:
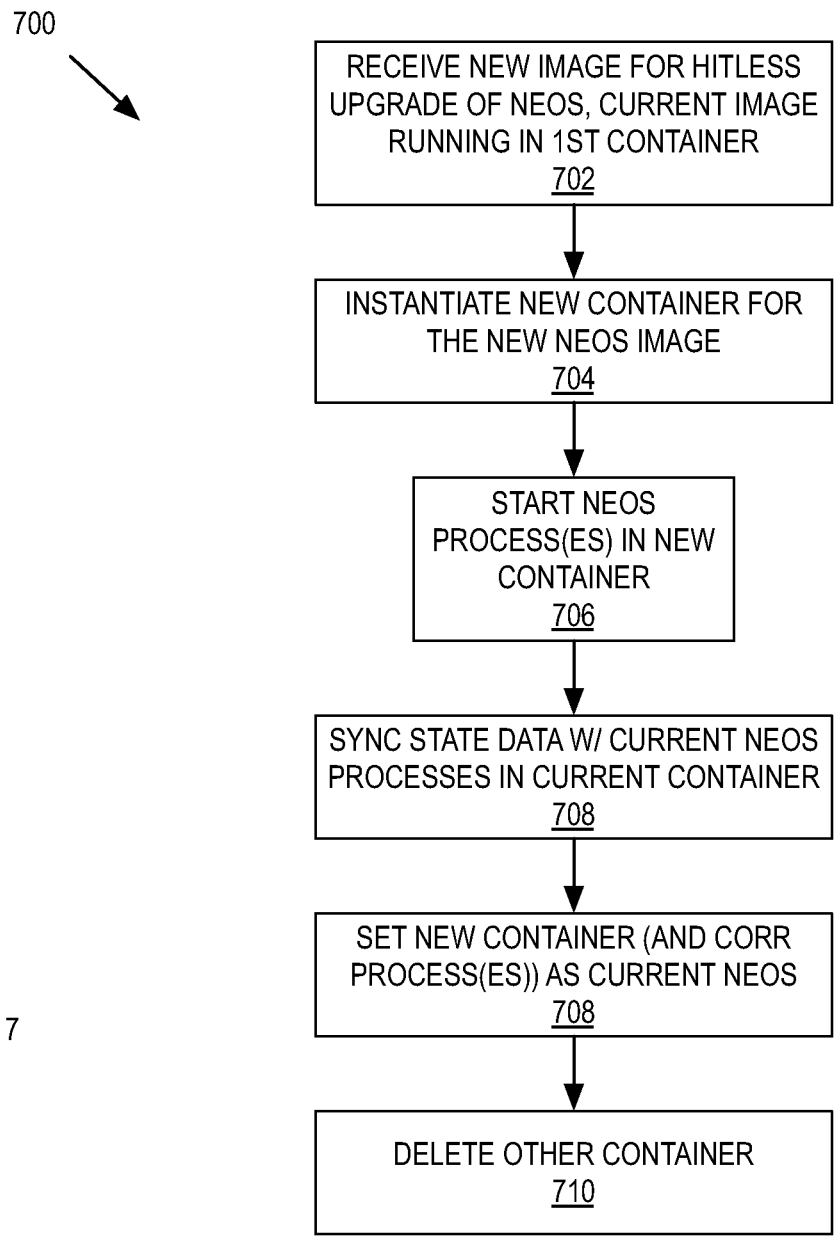
FIG. 7 is a flow diagrams of one embodiment of a process to perform a hitless upgrade of a network element operating system executing within a container of a host operating system.

FIG. 7 is a flow diagrams of one embodiment of a process 700 to perform a hitless upgrade of a network element operating system executing within a container of a host operating system. In FIG. 7, process 700 begins by receiving a new image for a hitless upgrade of the network element operating system, where a current image of the network element operating system is running in a first container. In one embodiment, the new image can be a software upgrade to the network element operating system, software downgrade to the network element operating system, or just a reinstallation of the same version of the network element operating system that is currently running on the network element. At block 704, process 700 instantiates a new container for the new network element operating system image. Process 700 starts the one or more network element operating system processes in the new container at block 706. At this point, the network element has two containers executing the network element operating system, where the network element operating system in the current container is the active network element operating system and the network element operating system executing in the new container will be the new version of the network element operating system once the switchover is made.

At block 708, process 700 synchronizes state data with the current network element operating system processes in the current container. In one embodiment, by synchronizing the state data with the current network element operating system processes, the new network element operating system processes will have the same or similar state as in the current network element operating system processes. While in one embodiment, the new network element operating system process(es) synchronize the state with the current network element operating system process(es), in alternate embodiments, the new network element operating system process(es) can rebuild a state from data stored in the network element. In one embodiment, process 700 sets the new container, and the corresponding processes, as the current network element operating system. In one embodiment, process 700 sets the new container, and the corresponding processes, as the current network element operating system by having these processes take control of the management mechanism for the network element operating system so that any new control plane data flows to the now current network element operating system processes in the newly instantiated container. At block 710, process 700 deletes the previously current container, which stops the previously current network element operating system processes and frees the memory used by these processes, as well as releasing any other resources used by the processes. At this point, the network element is executing the updated network element operating system without interrupting the processing of the data plane, because the network element did not need to be rebooted and the data plane processing did not need to be otherwise interrupted.

Figure 8:
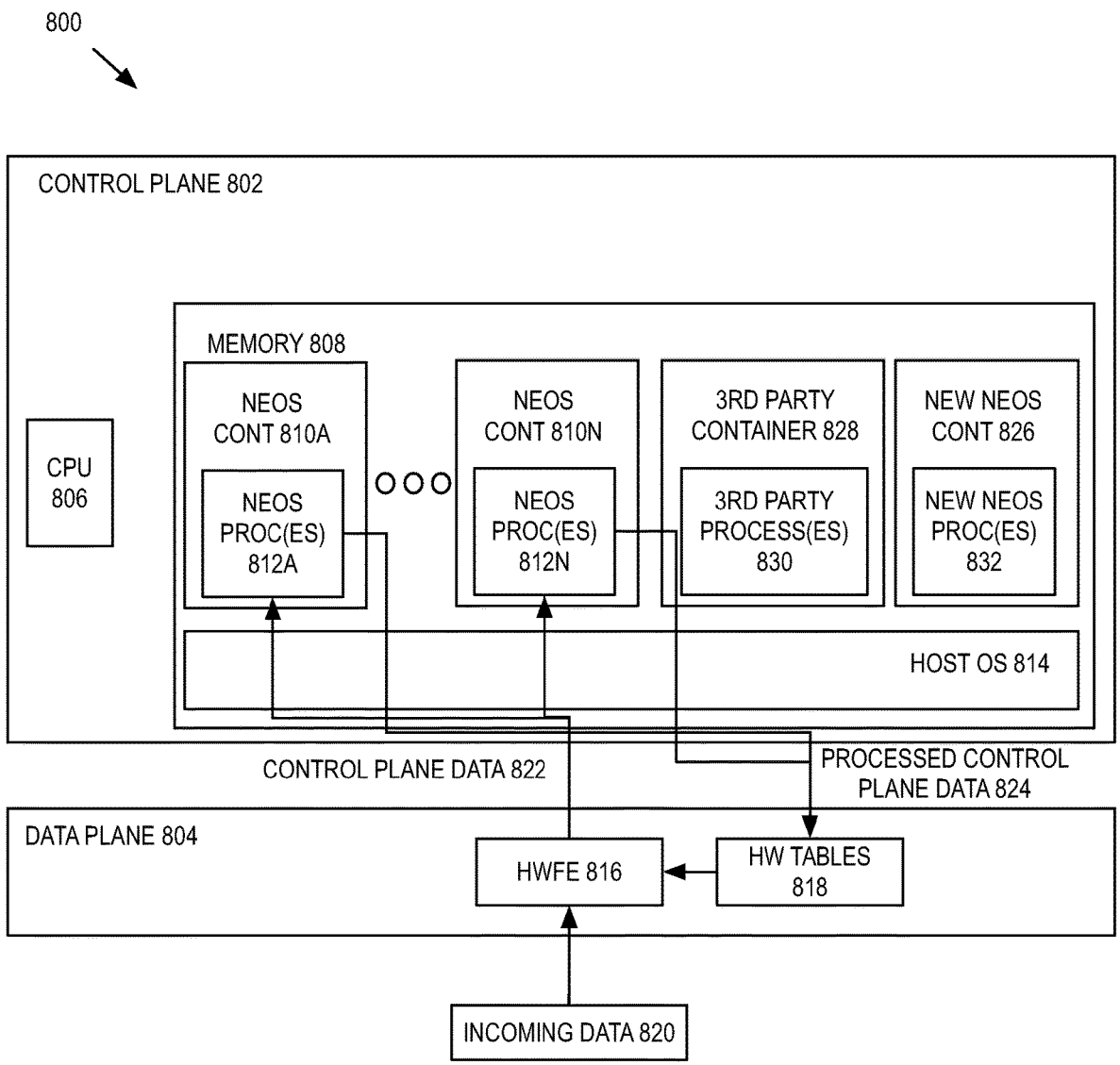
FIG. 8 is a block diagram of one embodiment of performing a hitless upgrade for a network element operating system function executing within one of multiple containers of a host operating system.

FIG. 8 is a block diagram of one embodiment of a network element 800 performing a hitless upgrade for a network element operating system function executing within one of multiple containers of a host operating system. FIG. 8 is block diagram of one embodiment of a network element 800 with a network element operating system executing within multiple containers 810A-N of a host operating system 814. In FIG. 8, network element 800 includes a control plane 802 coupled to a data plane 804. In one embodiment, the data plane 804 includes one or more hardware forwarding engines 816 and one or more hardware tables 818. In one embodiment, the hardware forwarding engines 816 are the hardware forwarding engines as described in FIG. 1 above. Furthermore, in this embodiment, the hardware tables 818 are the hardware tables as described in FIG. 1 above. In one embodiment, the data plane 804 processes the incoming data 820 using the hardware forwarding engines 816 according to the data in the hardware tables 818. In this embodiment, the hardware forwarding engines 816 decide whether to forward the data to a next hop, forward the data to the control plane 802, and/or further process the data. If the hardware forwarding engine 816 determines that the incoming data is control plane data, the hardware forwarding engine 816 forwards this control plane data 822 to the network element operating system process(es) 812A, where the network element operating system process(es) 812A processes this control plane data 822. If the incoming data 820 is data plane data, the hardware forwarding engines 816 can determine the next hop for this data and/or perform further processing of this data (e.g., apply a quality service, perform traffic shaping, process with relevant ACLs, and/or other processing).

The control plane 802, in one embodiment, includes a CPU 806 and memory 808. In this embodiment, the memory 808 includes a host operating system 814 and containers 810A-N that each can be instantiated by the host operating system 814, another container, or come other mechanism. In one embodiment, a container 810A-N is a namespace instance of an operating system level virtualization. In this embodiment, the container 810A-N is used for deploying and running processes without launching an entire virtual machine for each of these processes. Instead, these multiple isolated containers are run on a single control host operating system 814 and access the kernel of the host operating system 814. Because these containers 810A-N share the same host operating system kernel as the network element 800, the containers can be more efficient than virtual machines, which require separate operating system instances. The containers 810A-N include the components used to run the desired software, such as files, environmental variables, data, metadata, and/or libraries. In one embodiment, the containers 810A-N are compatible with the DOCKER types of containers.

As described above, the memory 808 includes the network element operating system containers 810A-N and further can include a third-party container 828 with a third-party process 830 that executes within the third-party container 828. In one embodiment, the functionalities of the network element operating system are split into multiple containers 810A-N, where there one or more network element operating system process(es) 812A-N per container 810A-N. In this embodiment, each of the network element operating system containers 810A-N is an isolated namespace used to execute the network element operating system process(es) 812A-N, where the network element operating system process(es) 812A-N can be used to manage the data stored in the hardware tables 818 and/or other management functionalities of the network element 800. By executing the network element operating system process(es) 812A in the network element operating system containers 810A-N, a network element operating system collectively can be run on a network element that is from a different vendor than the one that produced the network element operating system. For example and in one embodiment, a network element operating system from one vendor can be run on a white box network element that has a different vendor. Thus, instead of a network element operating system acting as the host operating system for the network element 800, the network element operating system acts as an application executing on the network element 800.

In FIG. 8, with the functionality of the network element operating system split across multiple network element operating system process(es), each of the processes 812A-N in the different containers 810A-N can act like a separate application that can be upgraded separately. In one embodiment, one of the containers 810A-N is used to execute a database process that receives and stores state data of the network element operating system processes 812A-N. In this embodiment, the database process is used to store various state data that is further used by the control plane to manage the network element 800.

In a further embodiment, each of the network element operating system processes 812A-N can share libraries from one or more layers for image compatibility and reduced image size. In this embodiment, these libraries are shared even when the network operating system is partitioned among multiple containers 810A-N. For example and in one embodiment, a routing container will have layers, such as a routing layer where a routing process executes, and a basic layer that is utilized by the routing layer. In a further example, hardware container will have the layers of the hardware agents and the basic layer. In these examples, the binary for the basic layer used by the routing and the hardware containers is the same binary, which leads to a reduced image size for these network element operating system processes it is also used for the image compose ability for these processes.

In a further embodiment, these multiple container 810A-N instances are used to manage different aspects of the network element. For example and in one embodiment, there can be processes 812A-N for the quality of service, access control lists management (or other types of security), policy service, fan agent, light emitting diode agent, temperature sensor agent, database service, management service(s), processes to support networking protocols (e.g. STP, routing protocols (e.g. such as RIP, BGP, OSPF, IS-IS, IGRP, EIGRP, PIM, DVMRP, and any/or other type or unicast or multicast routing protocol), MPLS, and/or other types of networking protocols), network flow management applications (e.g., openflow, directflow), process manager, and/or other types of processes for other types of functionality of the network element 800.

With the network element operating system functionality partitioned across different network element operating system containers 810A-N, upgrading of the network element operating system occurs by upgrading the image used by the specific network element operating system processes 812A-N into a new container 826 with a new executing process 832. In this embodiment, if the network element operating system upgrade affects a subset of the processes 812A-N, then the affected processes are the ones that get upgraded, without affecting the other processes. For example and of one embodiment, if process 812A is a BGP process of the network element operating system in this process has a critical bug fix that is available, a hitless upgrade can be accomplished by instantiating a container for a BGP image with this critical bug fix, starting a new BGP process within the new container, synchronizing a state between the current BGP process and the new BGP process, and switching control for the BGP processing of the network element operating system to the newly started BGP process. In one embodiment, because BGP is over TCP, when the container comes up, the new BGP process will establish a TCP session and re-syncronize with the remote host(s). In response to the re-synchronization process, the new BGP process takes over processing of any new BGP updates. In this embodiment, the other processes of the network element operating system are unaffected and can continue to perform their functionality and/or process relevant control plane data. In one embodiment, the state of the process being upgraded can be stored outside the affected container in other containers, such as a database container, or in a shared memory of an underlying system. In a further embodiment because the container itself is stateless, the new container and associated process(es) can instantly take over the processing of the relevant control plane data without a hit to the data plane processing.

Figure 9:
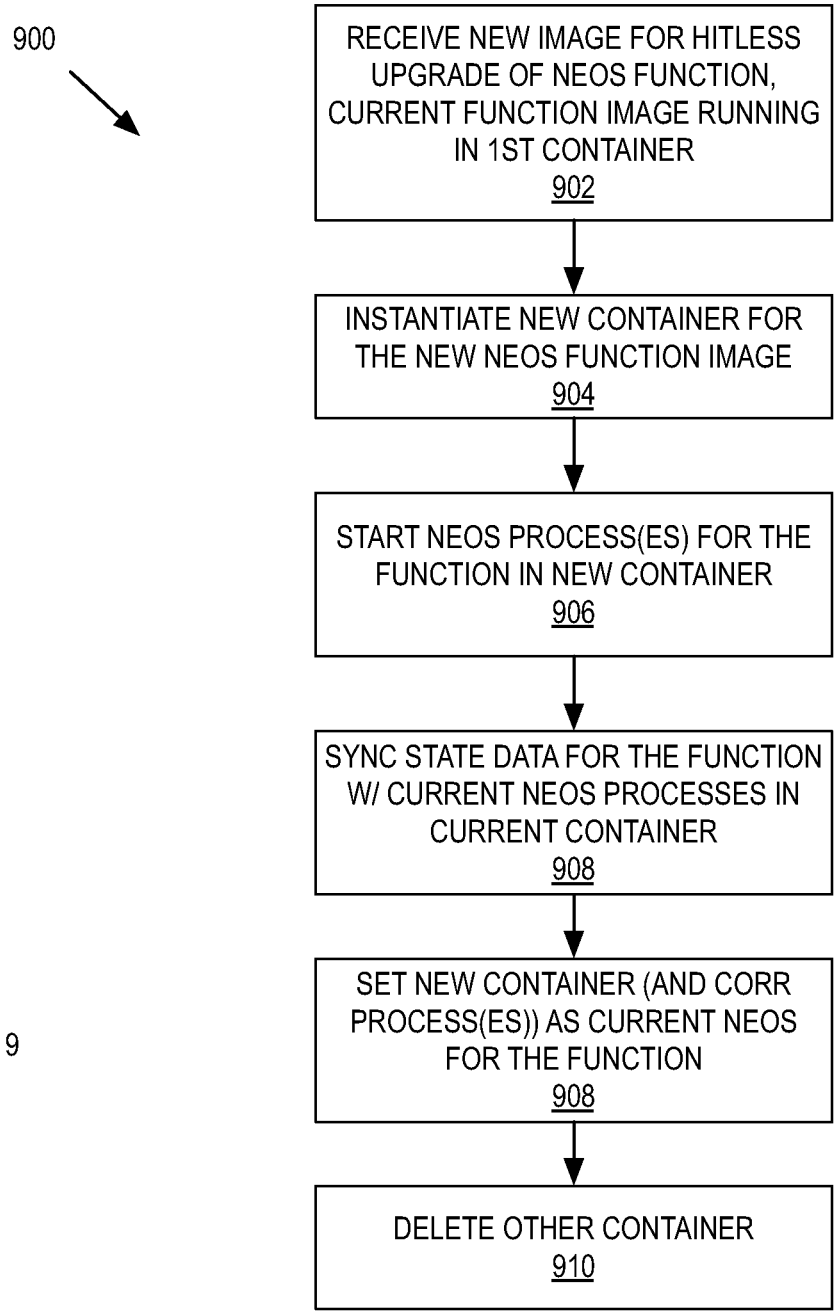
FIG. 9 is a flow diagrams of one embodiment of a process to perform a hitless upgrade for a network element operating system function executing within one of multiple containers of a host operating system.

FIG. 9 is a flow diagrams of one embodiment of a process to perform a hitless upgrade for a network element operating system function executing within one of multiple containers of a host operating system. In FIG. 9, process 900 begins by receiving a new image for a hitless upgrade of the network element operating system function, where a current image of the network element operating system function is running in a first container. In one embodiment, the new image can be a software upgrade to the network element operating system function, software downgrade to the network element operating system function, or just a reinstallation of the same version of the network element operating system function that is currently running on the network element. In this embodiment, the network element operating system function is currently executing as one or more processes in the first container. For example and in one embodiment, the image could be for a new version of the BGP service.

At block 904, process 900 instantiates a new container for the new network element operating system image of that function. Process 900 starts the one or more network element operating system processes for that function in the new container at block 906. At this point, the network element has two containers executing the network element operating system function, where the network element operating system in the current container is the active network element operating system for that function and the network element operating system executing in the new container will be the new version of the network element operating system function once the switchover is made. For example and in one embodiment, the network element, at this point includes two BGP processes executing in two different containers, where the current BGP processes in the active process and processing BGP updates and the new BGP process is waiting to eventually take over.

At block 908, process 900 synchronizes state data with the current network element operating system processes in the current container for that function. In one embodiment, by synchronizing the state data with the current network element operating system processes for that function, the new network element operating system processes will have the same state as in the current network element operating system processes for this function. Process 900 sets the new container, and the corresponding processes, as the current network element operating system for that function. In one embodiment process 900 sets the new container, and the corresponding processes, as the current network element operating system by synchronization data with remote host (e.g., BGP), taking over a socket for the process, taking over control of a platform driver that handles delivering messages to different containers, and/or some other action. In one embodiment, a new container can become up and running is less that one second. For example and in one embodiment, process 900 has the new BGP process take over responsibility for processing of any future BGP updates from the current BGP process.

At block 910, process 900 deletes the previously current container, which stops the previously current network element operating system function processes and frees the memory used by these processes. At this point, the network element is executing the updated network element operating system function without interrupting the processing of the data plane, because the network element did not need to be rebooted and the data plane processing did not need to be otherwise interrupted. For example and in one embodiment, is there are other routing protocol processes currently executing different containers during the BGP process upgrade, these other routing processes are unaffected because the BGP process is the only process being upgraded.

Dynamically Installing a Device Driver in a Network Element

Figure 10:
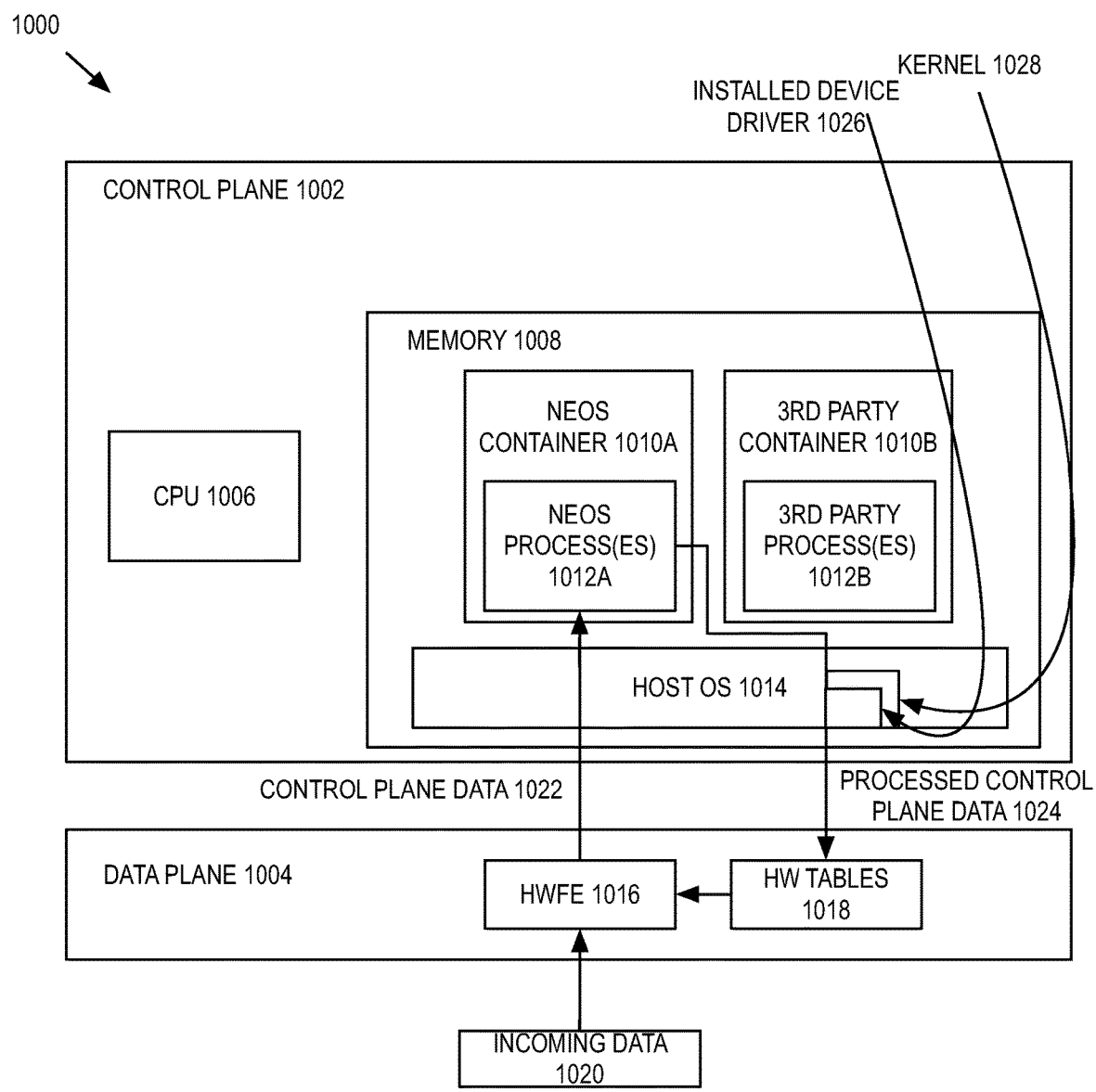
FIG. 10 is a block diagram of one embodiment of a network element that performs a device driver installation into a kernel of a host operating system by a network operating system executing in a container.

FIG. 10 is a block diagram of one embodiment of a network element 1000 that performs a device driver installation into a kernel of a host operating system 1014 by a network operating system executing in a container. FIG. 10 is a block diagram of one embodiment of a network element 1000 performing a hitless upgrade for a network element operating system executing within a container 1010A of a host operating system 1014. In FIG. 10, network element 1000 includes a control plane 1002 coupled to a data plane 1004. In one embodiment, the data plane 1004 includes one or more hardware forwarding engines 1016 and one or more hardware tables 1018. In one embodiment, the hardware forwarding engines 1016 are the hardware forwarding engines as described in FIG. 1 above. Furthermore, in this embodiment, the hardware tables 1018 are the hardware tables as described in FIG. 1 above. In one embodiment, the data plane 1004 processes the incoming data 1020 using the hardware forwarding engines 1016 according to the data in the hardware tables 1018. In this embodiment, the hardware forwarding engines 1016 decide whether to forward the data to a next hop, forward the data to the control plane 1002, and/or further process the data. If the hardware forwarding engine 1016 determines that the incoming data is control plane data, the hardware forwarding engine 1016 forwards this control plane data 1022 to the network element operating system process(es) 1012A, where the network element operating system process(es) 1012A processes this control plane data 1022. If the incoming data 1020 is data plane data, the hardware forwarding engines 1016 can determine the next hop for this data and/or perform further processing of this data (e.g., apply a quality service, perform traffic shaping, process with relevant ACLs, and/or other processing).

The control plane 1002, in one embodiment, includes a CPU 1006 and memory 1008. In this embodiment, the memory 1008 includes a host operating system 1014 and two containers 1010A-B that are each instantiated by the host operating system 1014, another container, or some other mechanism. In one embodiment, a container 1010A-B is a namespace instance of an operating system level virtualization. In this embodiment, the container 1010A-B is used for deploying and running processes without launching an entire virtual machine for each of these processes. Instead, these multiple isolated containers are run on a single control host operating system 1014 and access the kernel of the host operating system 1014. Because these containers 1010A-B share the same host operating system kernel as the network element 1000, the containers can be more efficient than virtual machines, which require separate operating system instances. The containers 1010A-B include the components used to run the desired software, such as files, environmental variables, data, metadata, and/or libraries. In one embodiment, the containers 1010A-B are compatible with the DOCKER types of containers.

As described above, the memory 1008 includes the network element operating system container 1010A and further can include a third-party container 1010B with a third-party process 1012B that executes within the third-party container 1012A. In one embodiment, the network element operating system container 1010A is an isolated namespace used to execute the network element operating system process(es) 1012A, where the network element operating system process(es) 1012A can be used to manage the data stored in the hardware tables 1018 and/or other management functionalities of the network element 1000. By executing the network element operating system process(es) 1012A in the network element operating system container 1010A, a network element operating system can be run on a network element that is from a different vendor than the one that produced the network element operating system. For example and in one embodiment, a network element operating system from one vendor can be run on a white box network element that has a different vendor. Thus, instead of a network element operating system acting as the host operating system for the network element 1000, the network element operating system acts as an application executing on the network element 1000.

In one embodiment, the network element operating system process(es) 1012A programs the hardware tables 1018 using an installed device driver 1026 that is part of kernel 1028 of the host operating system 1014. In this embodiment, because the host operating system 1014 does not know ahead of time which type of network element operating system process(es) 1012A will be instantiated in the control plane 1002, the network element operating system process(es) 1012A installs the device driver 1026 in the kernel 1028 based on the type of hardware in the data plane 1004. In this embodiment, the network element operating system process(es) 1012A determine the type of hardware in the data plane 1004 by invoking a utility of the host operating system to return system information. The network element operating system process(es) 1012A parses the information from the utility call. In this embodiment, the network element operating system process(es) 1012A can query the device family of ASIC that is part of the data plane 1004. In addition, a hardware agent of the network element operating system process(es) 1012A can handle minor version differences within an ASIC family (e.g., by inserting a module to make software development kit (SDK) calls for the purpose of handling different ASICs within an ASIC family). In one embodiment, the network element operating system process(es) 1012A determines which device driver to install based on the type of hardware forwarding engine 1016 that is part of the data plane 1004. For example and in one embodiment, the hardware forwarding engine 1016 can be a certain type of ASIC that is used in the data plane 1004. Based on the type of ASIC, the network element operating system process(es) 1012A determines the correct type of device driver and installs this device driver in the host operating system 1014 kernel 1028. In one embodiment, the network element operating system process(es) 1012A includes a variety of device drivers in part of the data of the network element operating system container 1010A and selects the appropriate device driver to be installed. In another embodiment, the network element operating system process(es) 1012A retrieves the appropriate device driver from a remote site (e.g., a website of the network element operating system process(es) 1012A vendor, or the host operating system 1014 vendor, or another remote site).

Figure 11:
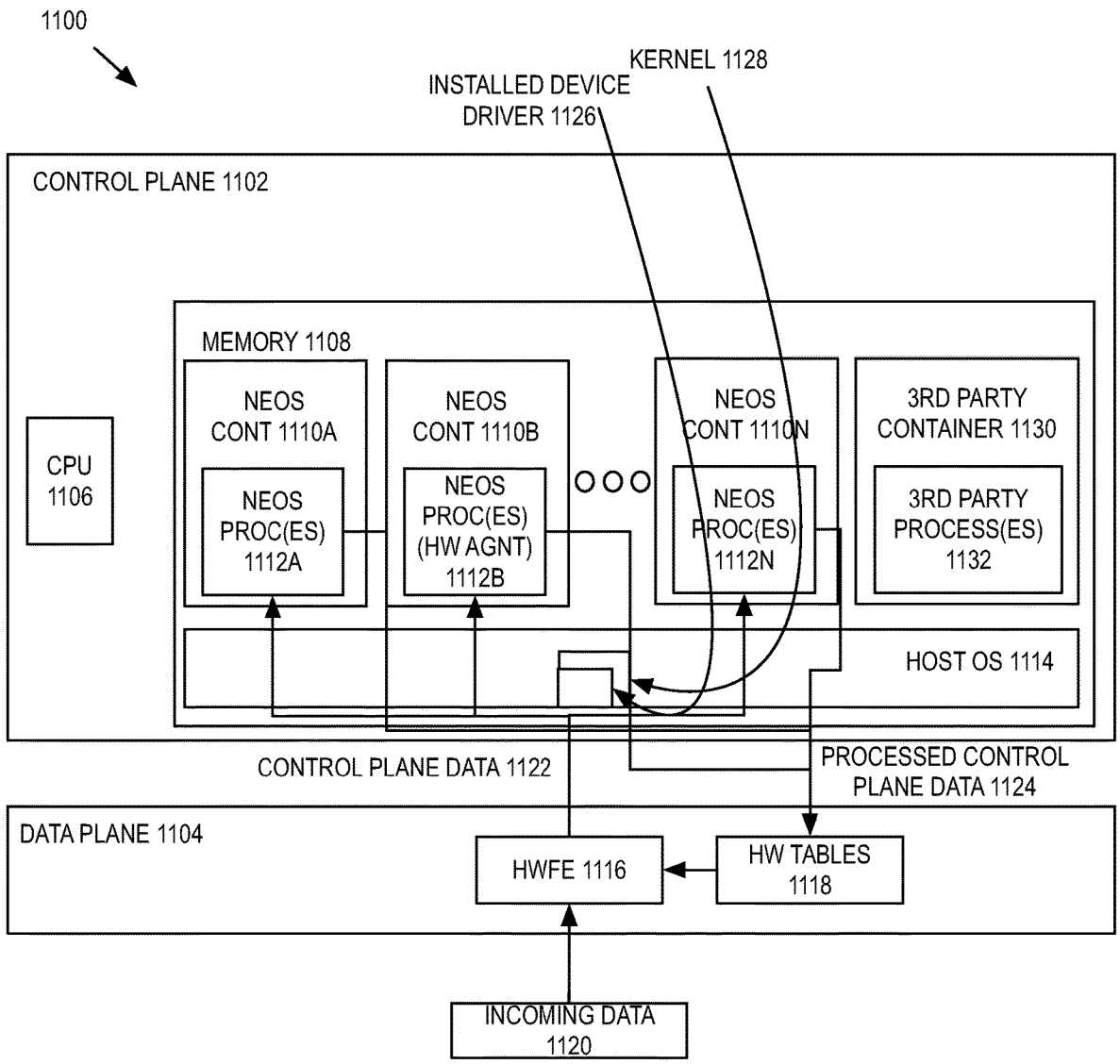
FIG. 11 is a block diagram of one embodiment of a network element that performs a device driver installation into a kernel of a host operating system by a network operating system functions executing in multiple containers.

In one embodiment, instead having one container for the network element operating system, the network element can have the functionality of the network element operating system partitioned into multiple containers with multiple processes, where one or more of the processes probes the hardware present in data plane and installs the appropriate device drive into the kernel of the host operating system. FIG. 11 is a block diagram of one embodiment of a process to install a device driver into a kernel of a host operating system by a network operating system functions executing in multiple containers. In FIG. 11, network element 1100 includes a control plane 1102 coupled to a data plane 1104. In one embodiment, the data plane 1104 includes one or more hardware forwarding engines 1116 and one or more hardware tables 1118. In one embodiment, the hardware forwarding engines 1116 are the hardware forwarding engines as described in FIG. 1 above. Furthermore, in this embodiment, the hardware tables 1118 are the hardware tables as described in FIG. 1 above. In one embodiment, the data plane 1104 processes the incoming data 1120 using the hardware forwarding engines 1116 according to the data in the hardware tables 1118. In this embodiment, the hardware forwarding engines 1116 decide whether to forward the data to a next hop, forward the data to the control plane 1102, and/or further process the data. If the hardware forwarding engine 1116 determines that the incoming data is control plane data, the hardware forwarding engine 1116 forwards this control plane data 1122 to the network element operating system process(es) 1112A, where the network element operating system process(es) 1112A processes this control plane data 1122. If the incoming data 2110 is data plane data, the hardware forwarding engines 1116 can determine the next hop for this data and/or perform further processing of this data (e.g., apply a quality service, perform traffic shaping, process with relevant ACLs, and/or other processing).

The control plane 1102, in one embodiment, includes a CPU 1106 and memory 1108. In this embodiment, the memory 1108 includes a host operating system 1114 and containers 1110A-N that are instantiated by the host operating system 1114, another container, or some other mechanism. In one embodiment, a container 1110A-N is a namespace instance of an operating system level virtualization. In this embodiment, the container 1110A-N is used for deploying and running processes without launching an entire virtual machine for each of these processes. Instead, these multiple isolated containers are run on a single control host operating system 1114 and access the kernel of the host operating system 1114. Because these containers 1110A-N share the same host operating system kernel as the network element 1100, the containers can be more efficient than virtual machines, which require separate operating system instances. The containers 1110A-N include the components used to run the desired software, such as files, environmental variables, data, metadata, and/or libraries. In one embodiment, the containers 1110A-N and/or 1130 are compatible with the DOCKER types of containers.

As described above, the memory 1108 includes the network element operating system containers 1110A-N and further can include a third-party container 1130 with a third-party process 1132 that executes within the third-party container 1130. In one embodiment, the functionalities of the network element operating system are split into multiple containers 1110A-N, where there one or more network element operating system process(es) 1112A-N per container 1110A-N. In this embodiment, each of the network element operating system containers 1110A-N is an isolated namespace used to execute the network element operating system process(es) 1112A-N, where the network element operating system process(es) 1112A-N can be used to manage the data stored in the hardware tables 1118 and/or other management functionalities of the network element 1100. By executing the network element operating system process(es) 1112A in the network element operating system containers 1110A-N, a network element operating system collectively can be run on a network element that is from a different vendor than the one that produced the network element operating system. For example and in one embodiment, a network element operating system from one vendor can be run on a white box network element that has a different vendor. Thus, instead of a network element operating system acting as the host operating system for the network element 1100, the network element operating system acts as an application executing on the network element 1100.

In one embodiment, one of the containers 1110A-N is used to execute a database process that receives and stores state data of the network element operating system processes 1112A-N. in this embodiment, the database process is used to store various state data that is further used by the control plane to manage the network element 1100.

In a further embodiment, each of the network element operating system processes 1112A-N can share libraries from one or more layers for image compatibility and reduced image size. In this embodiment, these libraries (were other types of binaries) our shared even when the network operating system is partitioned among multiple containers 1110A-N. For example and in one embodiment, a routing container will have layers, such as a routing layer where a routing process executes, and a basic layer that is utilized by the routing layer. In a further example, hardware container will have the layers of the hardware agents and the basic layer. In these examples, the binary for the basic layer used by the routing and the hardware containers is the same binary, which leads to a reduced image size for these network element operating system processes it is also used for the image compose ability for these processes.

In a further embodiment, these multiple container 1110A-N instances are used to manage different aspects of the network element. For example and in one embodiment, there can be processes 1112A-N for the quality of service, access control lists management (or other types of security), policy service, fan agent, light emitting diode agent, temperature sensor agent, database service, management service(s), processes to support networking protocols (e.g. STP, routing protocols (e.g. such as RIP, BGP, OSPF, IS-IS, IGRP, EIGRP, PIM, DVMRP, and any/or other type or unicast or multicast routing protocol), MPLS, and/or other types of networking protocols), network flow management applications (e.g., openflow, directflow), process manager, and/or other types of processes for other types of functionality of the network element 1100.

In one embodiment, the one or more of the network element operating system process(es) 1012A-N programs the hardware tables 1118 using an install device driver 1126 that is part of kernel 1128 of the host operating system 1114.

In this embodiment, because the host operating system 1114 does not know ahead of time which type of network element operating system process(es) 1112A-N will be instantiated in the control plane 1102, the one or more of the network element operating system process(es) 1112A-N installs the device driver 1126 in the kernel 1128 based on the type of hardware in the data plane 1104. In this embodiment, one or more of the network element operating system process(es) 1112A-N determines the type of hardware in the data plane 1104 by invoking a utility of the host operating system to return system information as described in FIG. 10 above.

In one embodiment, a network element operating system container 1110B includes a hardware agent (e.g., network element operating system process(es) 1112B). In this embodiment, the hardware agent 1112B can detect the type of hardware forwarding engine 1116 is in the data plane 1104 and retrieve the corresponding device driver 1126 for the data plane 1104. In addition, the hardware agent 1112B can further install the device driver 1126 into the host operating system kernel 1128. For example and in one embodiment, the hardware forwarding engine 1116 can be a certain type of ASIC that is used in the data plane 1104. Based on the type of ASIC, the hardware agent 1112B determines the correct type of device driver and installs this device driver in the host operating system 1114 kernel 1128. In one embodiment, the network element operating system process(es) 1112A includes a variety of device drivers in part of the data of the 1112B and selects the appropriate device driver to be installed. In another embodiment, the 1112B retrieves the appropriate device driver from a remote site (e.g., a website of the network element operating system process(es) 1112A vendor, or the host operating system 1114 vendor, or another remote site).

Figure 12:
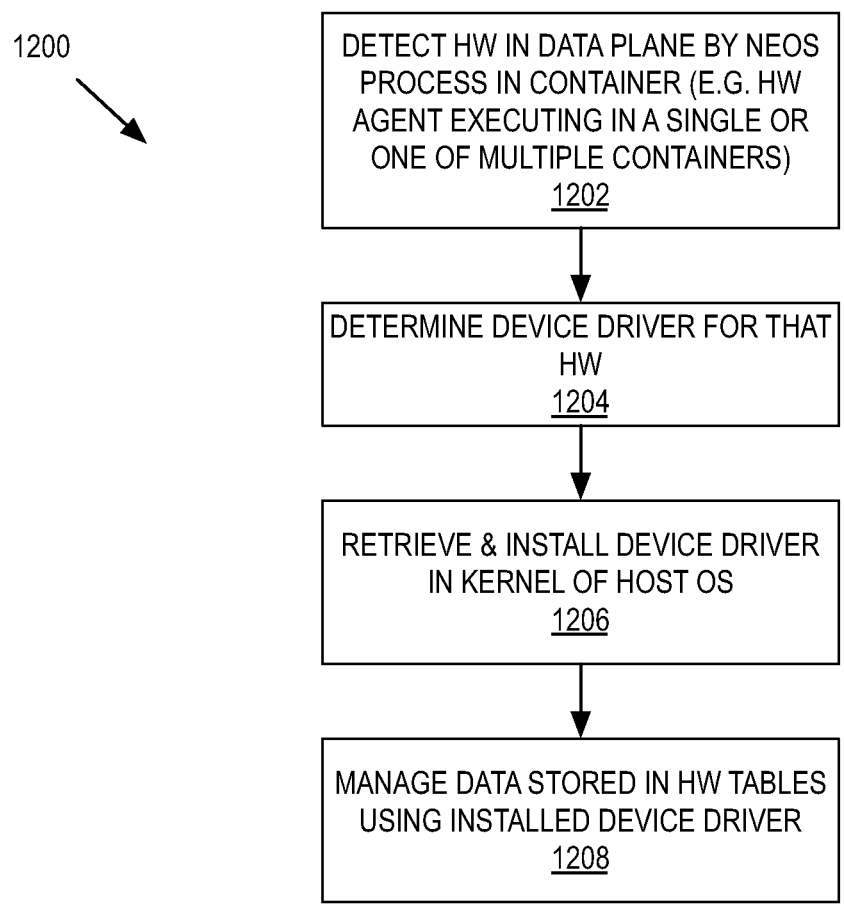
FIG. 12 is a flow diagram of one embodiment of a process to perform a device driver installation into a kernel of a host operating system by a network operating system executing in a container.

FIG. 12 is a flow diagram of one embodiment of a process 1200 to install a device driver into a kernel of a host operating system by a network operating system executing in a container. In FIG. 12, process 1200 begins by detecting the hardware in the data plane by a network element operating system process in a container at block 1202. In one embodiment, the network element operating system process is executing in a single container used for the network element operating system processes or can be in a container that is specific for the network element operating system process, where there are other containers for other network element operating system processes. In a further embodiment, the network element operating system process includes a hardware agent that is executing in a single or one of multiple containers for the network element operating system. At block 1204, process 1200 determines the device driver for the hardware. In one embodiment, process 1200 invoke a utility of the host operating system to return system information as described in FIG. 10 above. Process 1200 retrieves and installs a device driver in the kernel of the host operating system at block 1206. In one embodiment, process 1200 retrieves the corresponding device driver for the detected hardware from a set of device drivers locally stored or can retrieve the device driver from a remote site (e.g., a vendor website or some other remote site). With the retrieved device driver, process 1200 installs the device driver in the kernel of the host operating system. At block 1208, process 1200 manages the data stored in the hardware tables using the install device driver.

Simulating a Network Topology Using Containers

Figure 13:
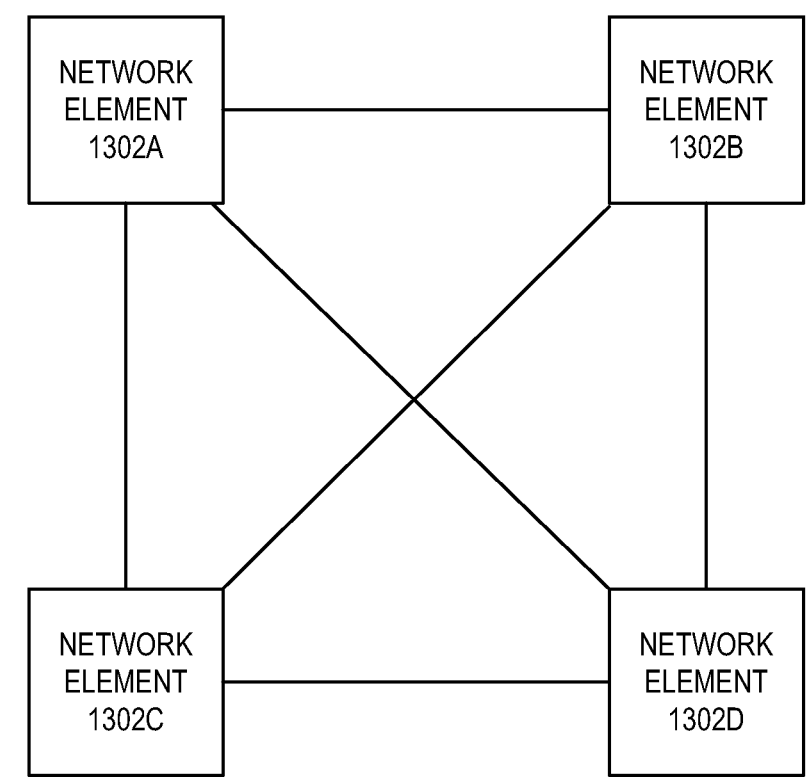
FIG. 13 is a block diagram of one embodiment of a topology of network elements.

A network element manufacturer will typically test the network elements that the manufacturer produces in a variety of different scenarios and topologies. Typically, the manufacturer will physically wire up the network elements in the topology under test, configure each of the network elements, and run the test. A downside of physically wiring the network elements is that it is expensive because a set of physical network elements is required to run the test and is time consuming to wire, check for errors, and start the test. Instead of physically wiring, the manufacturer can simulate a topology of network elements using software. FIG. 13 is a block diagram of one embodiment of a topology 1300 of network elements. In FIG. 13, system 1300 illustrates a typology of network elements 1302A-D that can be simulated using multiple containers. In one embodiment, the network elements 1302A-D are arranged in a full mesh topology where each of the network elements 1302A-D are connected to each of the other network elements 1302A-D. With four network elements 1302A-D illustrated, each of the network elements 1302A-D will be connected to three other network elements 1302A-D. While in one embodiment, there are four network elements 1302A-D illustrated in alternate embodiments there can be more or less network elements in the topology and these network elements can be arranged in a different type of topology for the test (e.g., spine-leaf, ring, dual-ring, star, bus, tree, and/or various other types of topologies for network elements).

Figure 14:
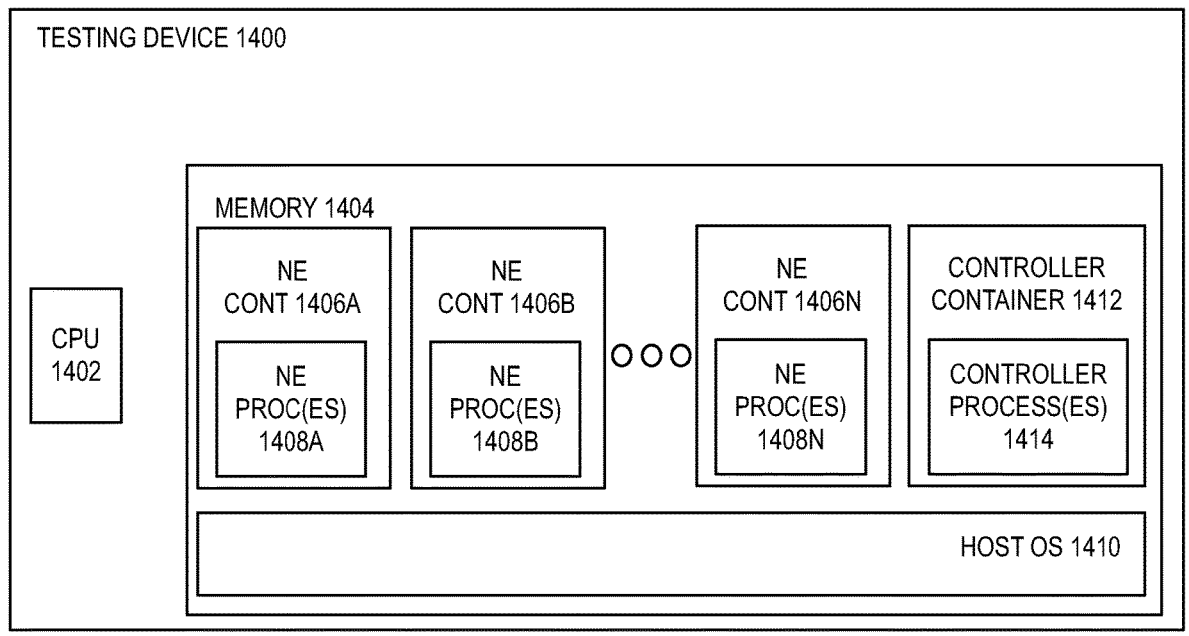
FIG. 14 is a block diagram of one embodiment of a device simulating multiple network elements in multiple containers.

FIG. 14 is a block diagram of one embodiment of a device 1400 simulating multiple network elements in multiple containers. In FIG. 14, the testing device 1400 includes CPU 1402 and memory 1404. In one embodiment, the CPU 1402 includes one or more processors (and/or processing cores) that is used to process instructions for the testing device 1400. In addition, the memory 1404 is system memory (e.g., DRAM or some other type of system memory) that is used to store instructions for a host operating system 1410, network element containers 1406A-N, and controller container 1412. In one embodiment, the host operating system 1410 is used to instantiate the network element containers 1406A-N and controller container 1412. In another embodiment, the network containers 1406A-N can each be alternatively instantiated by another container or some other mechanism. In one embodiment, device 1400 is any type of device that can communicate network data with another device (e.g., a personal computer, laptop, server, mobile device (e.g., phone, smartphone, personal gaming device, etc.), another network element, etc.). In one embodiment, the device 1400 can be a virtual machine or can be a device that hosts one or more virtual machines.

The network element containers 1406A-N are containers that are used to isolate the network element process(es) 1408A-N within separate name spaces of the containers 1406A-N. In this embodiment, each of the network element process(es) 1408A-N represents one or more of the network elements under test, where the processes 1406A-N are configured for the appropriate network topology and configuration. For example in one embodiment, these processes 1406A-N can be configured in a mesh, star, spine-leaf, or other type of network topology. In addition, each of the processes 1406A-N are configured with the appropriate network services and protocols for the test. Alternatively, the services and protocols can be configured using the same and/or different topologies. In one embodiment, the controller container 1412 includes a controller process(es) 1414 that is used to configure, run, and gather the results of the test.

In one embodiment, by simulating this network topology using multiple containers, network topologies can be simulated on a massive scale on a single virtual machine on a server or in the cloud. In this embodiment, this scale can be accomplished by using containers for the simulated network elements because the containers share the same binaries and/or kernel. In addition, an administrator can change or upgrade a network element operating system used by changing a single share binary. Furthermore, customers can test drive a network (e.g., a datacenter fabric) from a vendor easily before buying or deploying the network elements. Customers can additionally develop and test operational tooling using this simulated network elements before actual deploying the physical network elements. In one embodiment, each container allows a simulated network element to behave like a different network element. In one embodiment, a simulated network element should be isolated by using a separate server, virtual machine, or container. In this embodiment, using containers offers the isolation with the least amount of overhead, thus allowing a greater scale of network topology to be simulated. In a further embodiment, the processes in the different containers can communicate with each using virtual wires that is provided by the host operating system (e.g. Linux Bridges, vSwitches (e.g., Open vSwitch), MacVLANS, single root input/output virtualization).

Figure 15:
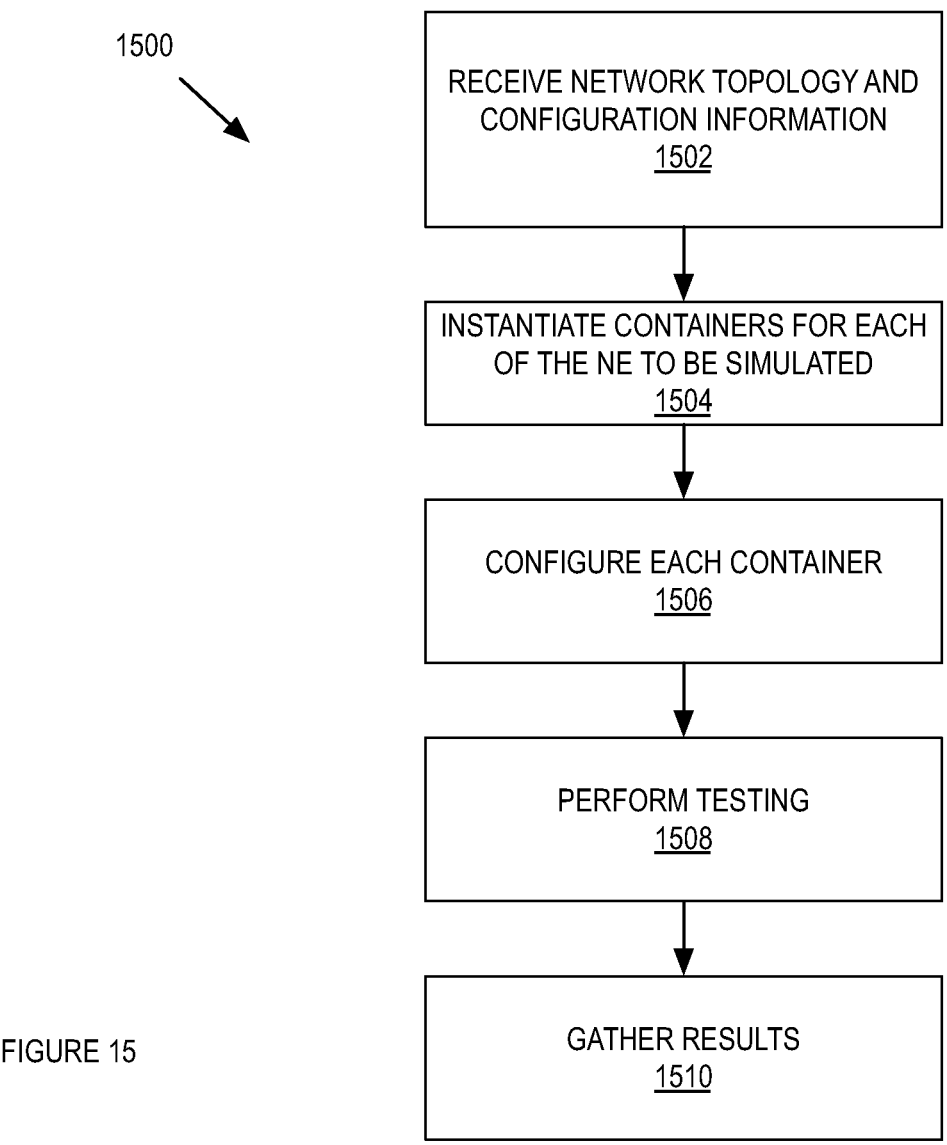
FIG. 15 is a flow diagram of one embodiment of a process to simulate multiple network elements in multiple containers.

FIG. 15 is a flow diagram of one embodiment of a process 1500 to simulate multiple network elements in multiple containers. In FIG. 15, process 1500 begins by receiving the network topology and configuration information for the test be performed at block 1502. In one embodiment, the network topology and configuration information is information used to set up the simulated network topology of network elements and to configure each of these simulated network elements. At block 1504, process 1500 is instantiates the containers for each of the network elements to be simulated. In one embodiment, there can be one or more network elements simulated in each of the containers. Process 1500 configures each container with the network element process(es) at block 1506. In one embodiment, process 1500 configures the processes for the test to be performed using the desired network topology and configuration for each of the simulated network elements. For example in one embodiment, process 1500 can configure the simulated network elements in a full mesh topology, were each of the N network elements is connected to the other N-1 network elements, and further configure each of the simulated network elements with the appropriate network services and/or protocols. At block 1508, process 1500 performs the testing. In one embodiment, each of the simulated network elements generates network data received, processed, and forwarded according to the test. At block 1510, process 1500 gathers the results. In one embodiment, with the gathered results, process 1500 can present the results and/or store the results for later viewing.

Figure 16:
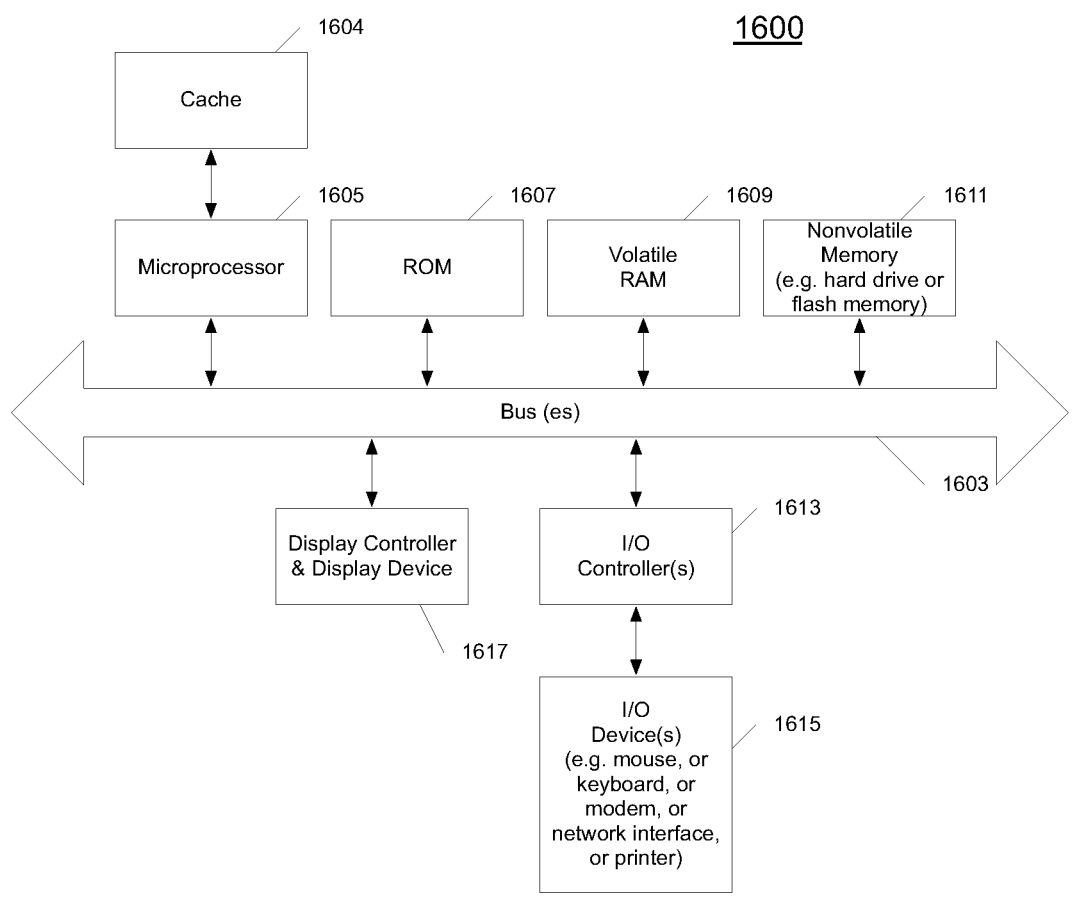
FIG. 16 illustrates one example of a typical computer system, which may be used in conjunction with the embodiments described herein.

FIG. 16 shows one example of a data processing system 1600, which may be used with one embodiment of the present invention. For example, the system 1600 may be implemented including a network element 100 as shown in FIG. 1. Note that while FIG. 16 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 16, the computer system 1600, which is a form of a data processing system, includes a bus 1603 which is coupled to a microprocessor(s) 1605 and a ROM (Read Only Memory) 1607 and volatile RAM 1609 and a non-volatile memory 1611. The microprocessor 1605 may retrieve the instructions from the memories 1607, 1609, 1611 and execute the instructions to perform operations described above. The bus 1603 interconnects these various components together and also interconnects these components 1605, 1607, 1609, and 1611 to a display controller and display device 1617 and to peripheral devices such as input/output (I/O) devices which may be mice, keyboards, modems, network interfaces, printers and other devices which are well known in the art. In one embodiment, the system 1600 includes a plurality of network interfaces of the same or different type (e.g., Ethernet copper interface, Ethernet fiber interfaces, wireless, and/or other types of network interfaces). In this embodiment, the system 1600 can include a forwarding engine to forward network date received on one interface out another interface.

Typically, the input/output devices 1615 are coupled to the system through input/output controllers 1613. The volatile RAM (Random Access Memory) 1609 is typically implemented as dynamic RAM (DRAM), which requires power continually in order to refresh or maintain the data in the memory.

The mass storage 1611 is typically a magnetic hard drive or a magnetic optical drive or an optical drive or a DVD ROM/RAM or a flash memory or other types of memory systems, which maintains data (e.g. large amounts of data) even after power is removed from the system. Typically, the mass storage 1611 will also be a random access memory although this is not required. While FIG. 16 shows that the mass storage 1611 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1603 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus, processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 17:
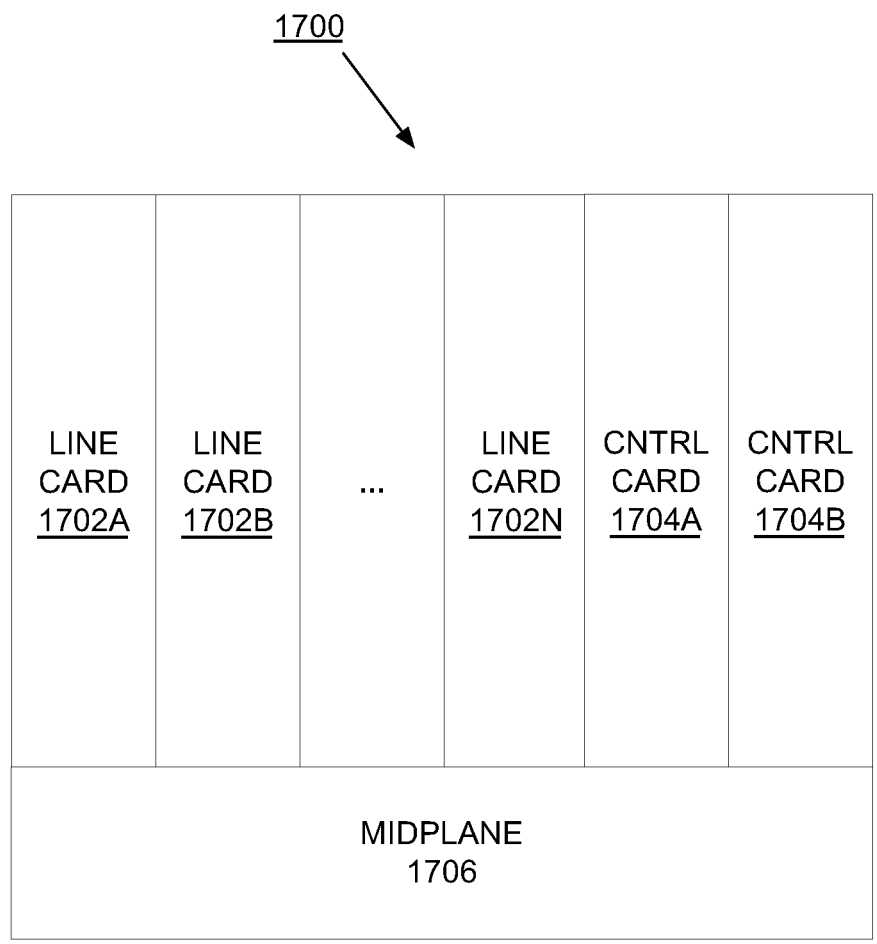
FIG. 17 is a block diagram of one embodiment of an exemplary network element that instantiates a container in a network element.

FIG. 17 is a block diagram of one embodiment of an exemplary network element 1700 that instantiates a container. In FIG. 17, the midplane 1706 couples to the line cards 1702A-N and controller cards 1704A-B. While in one embodiment, the controller cards 1704A-B control the processing of the traffic by the line cards 1702A-N, in alternate embodiments, the controller cards 1704A-B, perform the same and/or different functions (e.g., instantiate a container as described in FIGS. 2-5 above, upgrade a container as described in FIGS. 6-9 above, install a device driver as described in FIGS. 10-12 above, and/or simulate a network topology as described in FIGS. 13-15 above). In one embodiment, the line cards 1702A-N process and forward control plane data to the controller cards 1704A-B. It should be understood that the architecture of the network element 1700 illustrated in FIG. 17 is exemplary, and different combinations of cards may be used in other embodiments of the invention.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "detecting," "determining," "installing," "updating," "storing," "instantiating," "bridging," "processing," "setting," "synchronizing," "deleting," "stopping," "managing," "saving," "performing," "configuring," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to simulate a plurality of network elements, the method comprising:
   receiving network topology information for the plurality simulated network elements;
   instantiating a plurality of containers for the plurality of simulated network elements, wherein the plurality of containers are instances of a host operating system virtualization, and wherein at least a portion of the plurality of simulated network elements includes a control plane and a data plane; and
   configuring a set of processes for each of the plurality of containers, wherein each of the set of processes simulates at least one of the plurality of simulated network elements and the set of processes implements network topology represented by the network topology information.

2. The machine-readable medium of claim 1, further comprising:
   performing a test of the network topology; and
   saving a result of the test.

3. The machine-readable medium of claim 2, wherein the performing a test comprises:
   performing data processing and forwarding in a test device control plane of a test device performing the method.

4. The machine-readable medium of claim 1, wherein each of the plurality of the set of processes implement a network element operating system.

5. The machine-readable medium of claim 1, wherein the plurality of the set of processes share a same kernel of the host operating system.

6. The machine-readable medium of claim 1, wherein the plurality of the set of processes share a same binary.

7. The machine-readable medium of claim 1, wherein the network topology is selected from the group consisting of a mesh topology, a spine-leaf topology, ring topology, dual-ring topology, star topology, bus topology, and tree topology.

8. The machine-readable medium of claim 1, wherein at least some of the plurality of containers share an object and the object is selected from the group consisting of a binary and a library.

9. The machine-readable medium of claim 1, wherein the plurality of simulated network elements communicates with each other using virtual wires.

10. The machine-readable medium of claim 9, wherein the virtual wires are provided by the host operating system.

11. The machine-readable medium of claim 9, wherein the virtual wires are selected from the group consisting of a LINUX Bridge, vSwitch, Mac Virtual Local Area Network, and a single root input/output virtualization.

12. A method to simulate a plurality of network elements, the method comprising:
   receiving network topology information for the plurality of simulated network elements;
   instantiating a plurality of containers for the plurality of simulated network elements, wherein the plurality of containers are instances of a host operating system virtualization, and wherein at least a portion of the plurality of simulated network elements includes a control plane and a data plane; and
   configuring a set of processes for each of the plurality of containers including, wherein each of the set of processes simulates at least one of the plurality of simulated network elements and the set of processes implements network topology represented by the network topology information.

13. The method of claim 12, further comprising:
performing a test of the network topology; and
saving results of the test.

14. The method of claim 12, wherein the performing a test comprises:
   performing data processing and forwarding in a test device control plane of a test device performing the method.

15. The method of claim 12, wherein each of the plurality of the set of processes implement a network element operating system.

16. The method of claim 12, wherein the plurality of the set of processes share a same kernel of the host operating system.

17. The method of claim 12, wherein the plurality of the set of processes share a same binary.

18. The method of claim 12, wherein the network topology is selected from the group consisting of a mesh topology, spine-leaf topology, ring topology, dual-ring topology, star topology, bus topology, and tree topology.

19. The method of claim 12, wherein at least some of the plurality of containers share an object and the object is selected from the group consisting of a binary and a library.

20. The method of claim 12, wherein the plurality of simulated network elements communicates with each other using virtual wires.

21. The method of claim 20, wherein the virtual wires are provided by the host operating system.

22. The method of claim 20, wherein the virtual wires are selected from the group consisting of a LINUX Bridge, vSwitch, Mac Virtual Local Area Network, and a single root input/output virtualization.

* * * * *